(12) United States Patent
Wason

(10) Patent No.: US 12,138,770 B2
(45) Date of Patent: Nov. 12, 2024

(54) TOOL DRIVE ASSEMBLY WITH INTEGRATED LEAD DRIVE SHAFT

(71) Applicant: Hubbell Incorporated, Shelton, CT (US)

(72) Inventor: Peter Matthew Wason, Auburn, NH (US)

(73) Assignee: Hubbell Incorporated, Shelton, CT (US)

( * ) Notice: Subject to any disclaimer, the term of this patent is extended or adjusted under 35 U.S.C. 154(b) by 0 days.

(21) Appl. No.: 17/105,172

(22) Filed: Nov. 25, 2020

(65) Prior Publication Data

US 2021/0154821 A1    May 27, 2021

Related U.S. Application Data

(60) Provisional application No. 62/987,730, filed on Mar. 10, 2020, provisional application No. 62/941,412, filed on Nov. 27, 2019.

(51) Int. Cl.
*B25F 5/00* (2006.01)
*B25F 5/02* (2006.01)
(Continued)

(52) U.S. Cl.
CPC ......... *B25F 5/001* (2013.01); *H01R 43/0428* (2013.01); *B25F 5/02* (2013.01); *F16H 1/46* (2013.01)

(58) Field of Classification Search
CPC ..... A61B 17/07207; F16H 1/46; B25F 5/001; B25F 5/02; B25F 5/025; H01R 43/0428
See application file for complete search history.

(56) References Cited

U.S. PATENT DOCUMENTS 2,780,944 A    2/1957  Ondeck
5,662,545 A *  9/1997  Zimmerman ......... F16H 57/023
                                                  475/331
(Continued)

FOREIGN PATENT DOCUMENTS

CN    107405703    11/2017
CN    107810076    3/2018
(Continued)

OTHER PUBLICATIONS

International Search Report and Written Opinion in corresponding International Application PCT/US2020/062346 mailed on Mar. 10, 2021.

(Continued)

*Primary Examiner* — Daniel Jeremy Leeds
(74) *Attorney, Agent, or Firm* — Wissing Miller LLP

(57) ABSTRACT

A drive assembly for portable, hand-held, battery powered tools is provided. The tool may be configured as a crimping tool, a cutting tool or other type of tool. The tool has an in-line handle assembly and a working head assembly. The drive assembly includes a drive assembly housing, a gear assembly, a lead drive shaft and a bearing system. The gear assembly is a multi-stage gear assembly having an input tier and an output tier. The input tier is operatively connected to a motor and the output tier is connected to a lead drive shaft. The lead drive shaft has a proximal end extending into a distal end portion of the drive assembly housing. The bearing system is positioned within the drive assembly housing adjacent the output tier of the gear assembly. The bearing system is interactive with the lead drive shaft enabling the drive assembly to withstand radial and axial loads as the lead drive shaft is rotated during an operation of the tool.

18 Claims, 24 Drawing Sheets

(51) Int. Cl.
*F16H 1/46* (2006.01)
*H01R 43/042* (2006.01)

(56) References Cited

U.S. PATENT DOCUMENTS

| | | | |
|---|---|---|---|
| 5,735,353 A | 4/1998 | Undin | |
| 5,779,589 A | 7/1998 | Futterer | |
| RE37,905 E | 11/2002 | Bourner et al. | |
| 6,520,266 B2 | 2/2003 | Bongers-Ambrosius et al. | |
| 6,662,620 B1 | 12/2003 | Baron et al. | |
| 6,676,558 B2 | 1/2004 | Futterer | |
| 7,766,787 B2 * | 8/2010 | Liu | B25F 5/001 |
| | | | 475/331 |
| 8,313,411 B2 | 11/2012 | Schafer | |
| 8,336,640 B2 | 12/2012 | Saur | |
| 8,829,750 B2 * | 9/2014 | Sherwin | H02K 1/223 |
| | | | 310/83 |
| 9,033,849 B2 | 5/2015 | Klein et al. | |
| 9,097,331 B2 | 8/2015 | Saur et al. | |
| D767,959 S | 10/2016 | Sokat et al. | |
| 9,680,347 B2 | 6/2017 | Sherwin et al. | |
| 9,993,885 B2 | 6/2018 | Frenken | |
| 2002/0094907 A1 | 7/2002 | Elger | |
| 2009/0098975 A1 | 4/2009 | Liu | |
| 2014/0001234 A1 | 1/2014 | Shelton, IV et al. | |
| 2015/0196295 A1 | 7/2015 | Shelton, IV et al. | |
| 2019/0047125 A1 | 2/2019 | Junkers et al. | |

FOREIGN PATENT DOCUMENTS

| | | |
|---|---|---|
| DE | 19709017 | 6/1998 |
| EP | 679476 | 4/1995 |

OTHER PUBLICATIONS

Greenlee Tetron Inc, EL50ML Battery-powered Crimping Tool Instruction Manual, pp. 1-16, www.greenlee.com, Mar. 2015.
International Preliminary Report of Patentability mailed in corresponding PCT Application No. PCT/US20/62346 on Jun. 9, 2022 (6 pages).
International Preliminary Report of Patentability mailed in PCT/US20/62346 on Jun. 9, 2022 (6 pages).
First Office Action mailed in CN 202080089953.3 on Jul. 19, 2023 (12 pages).
Extended European Search Report mailed in corresponding EP 20893562.7 on Oct. 10, 2023 (8 pages).

* cited by examiner

Fig. 22
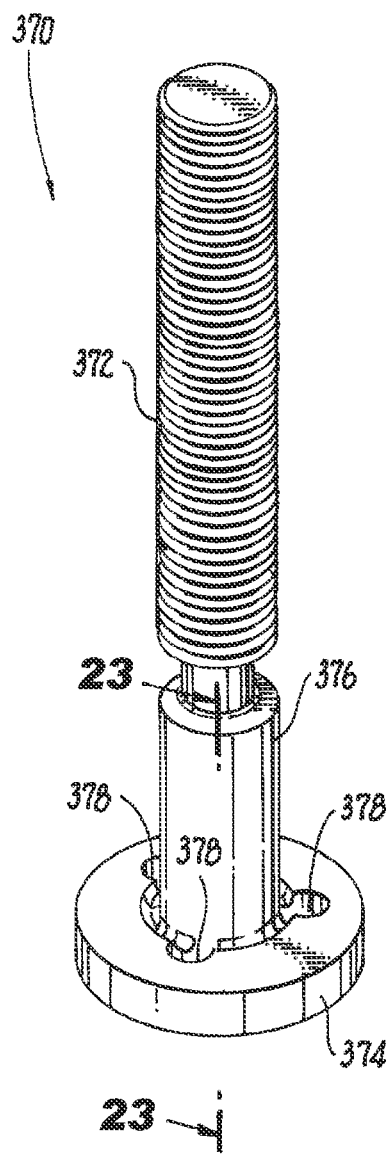
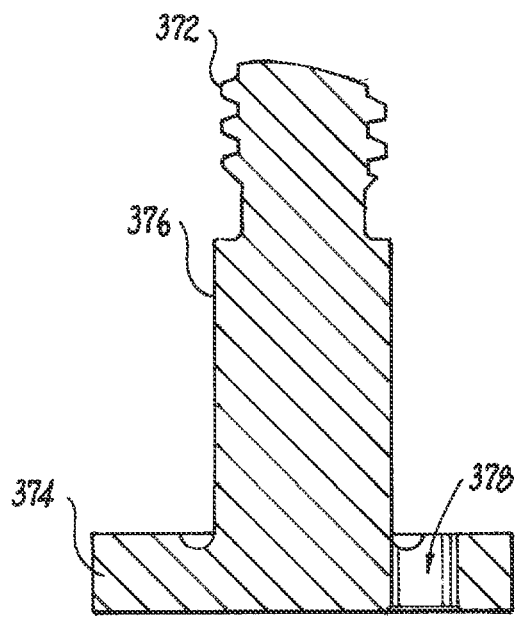
Fig. 23

TOOL DRIVE ASSEMBLY WITH INTEGRATED LEAD DRIVE SHAFT

CROSS REFERENCE TO RELATED APPLICATIONS

The present disclosure is based on and claims benefit from U.S. Provisional Patent Application Ser. No. 62/941,412 filed on Nov. 27, 2019 entitled "Crimping Tool Drive Assembly with Integrated Lead Drive Shaft" and from U.S. Provisional Patent Application Ser. No. 62/987,730 filed on Mar. 10, 2020 "Crimping Tool Drive Assembly with Integrated Lead Drive Shaft" the entire contents of both are incorporated herein by reference.

BACKGROUND

Field

The present disclosure relates to drive assemblies for portable, battery powered tools having one or more moving jaws. More particularly, the present disclosure relates to hand-held crimping tool drive assemblies that translate rotational movement of a motor into movement of at least one of a pair of jaws used to crimp an object.

Description of the Related Art

Hand-held, battery powered crimping tools are known in the art. Such tools are sometimes referred to as a pressing tool. Using such tools, an electrical wire termination is manually held in place between a pair of jaws, namely a fixed jaw and a movable jaw. Crimping of the electrical wire termination is carried out when a motor is activated causing the movable jaw to move toward the fixed jaw so that the jaws impinge the object. However, the motor, gearbox and other hardware used to move the movable jaw are bulky which lead to packaging complications, and are expensive components driving up the cost to manufacture such tools.

The present disclosure provides drive assemblies that can be used with hand-held, battery powered crimping tools that reduce the bulkiness of the drive assembly and the cost to manufacture.

SUMMARY

The present disclosure provides exemplary embodiments of portable, hand-held, battery powered crimping tools and drive assemblies for such tool. For example, the crimping tool may be a battery powered crimping tool having an in-line handle assembly and a working head assembly. The handle assembly has a tool frame and an outer housing. The working head assembly has a pair of jaw assemblies mounted to the tool frame such that at least one of the jaw assemblies is movable relative to the other jaw assembly. Each jaw assembly may include a die for crimping an object or a blade for cutting an object.

In one exemplary embodiment, the drive assembly includes a drive assembly housing, a gear assembly, a lead drive shaft and a bearing system. The gear assembly is positioned within the drive assembly housing and is a multi-stage gear assembly having at least an input stage and an output stage. The lead drive shaft has a proximal end extending at least partially into a distal end portion of the drive assembly housing. The proximal end of the lead drive shaft has a tip that is coupled to output stage of the gear assembly. The bearing system is positioned within the drive assembly housing adjacent the output stage of the gear assembly. The bearing system is interactive with the lead drive shaft enabling the drive assembly to withstand radial and axial loads as the lead drive shaft is rotated during an operation of the tool.

In another exemplary embodiment, the drive assembly includes a drive assembly housing, a gear assembly, a lead drive shaft, a bearing system. The gear assembly is positioned within the drive assembly housing and includes a multi-stage planetary gear assembly. The multi-stage planetary gear assembly has at least an input stage and an output stage. The multi-stage planetary gear assembly includes a ring gear used by each stage of the multi-stage planetary gear assembly. The lead drive shaft has a distal end portion, a proximal end portion and an intermediate portion between the distal end portion and the proximal end portion. The distal end portion being threaded and substantially outside the drive assembly housing. The intermediate portion has a smooth exterior surface. In an exemplary embodiment, the proximal end portion is positioned within the drive assembly housing and forms a carrier plate of the output stage of the planetary gear assembly. The bearing system is positioned at least partially within the drive assembly housing, and is interactive with the lead drive shaft enabling the drive assembly to withstand radial and axial loads as the lead drive shaft is rotated during an operation of the tool. In one exemplary embodiment, the bearing system includes a radial bearing and a thrust bearing assembly adjacent the radial bearing. The radial bearing and the thrust bearing assembly are positioned within the drive assembly housing. The thrust bearing assembly rests on the proximal end portion of the lead drive shaft and around the intermediate portion of the lead drive shaft, and the radial bearing is adjacent the thrust bearing assembly around the intermediate portion of the lead drive shaft. In another exemplary embodiment, the bearing system includes a radial bearing, a first thrust bearing assembly adjacent the radial bearing and a second thrust bearing assembly. In this embodiment, the radial bearing and the first thrust bearing assembly are positioned within the drive assembly housing and the second thrust bearing assembly rests on an exterior of the drive assembly housing. Preferably, the first thrust bearing rests on the proximal end portion of the lead drive shaft and around the intermediate portion of the lead drive shaft, and the radial bearing is adjacent the first thrust bearing assembly around the intermediate portion of the lead drive shaft. The second thrust bearing assembly is around a portion of the intermediate portion of the lead drive shaft extending out of the drive assembly housing.

In another exemplary embodiment, the drive assembly includes a drive assembly housing, a gear assembly, a lead drive shaft, a bearing system. The gear assembly is positioned within the drive assembly housing, and includes a first stage planetary gear assembly as an input stage and a second stage planetary gear assembly as an output stage. In this exemplary embodiment, the first stage and the second stage use a common ring gear. The lead drive shaft has a distal end portion, a proximal end portion and an intermediate portion between the distal end portion and the proximal end portion. The proximal end portion is positioned within the drive assembly housing and forms a carrier plate of the output stage of the planetary gear assembly. The distal end portion is threaded and substantially outside the drive assembly housing, and the intermediate portion has a smooth exterior surface. The bearing system is positioned at least partially within the drive assembly housing. The bearing system is interactive with the lead drive shaft enabling the drive assembly to withstand radial and axial loads as the lead drive shaft is rotated during an operation of the tool.

BRIEF DESCRIPTION OF THE DRAWINGS

The figures depict embodiments for purposes of illustration only. One skilled in the art will readily recognize from the following description that alternative embodiments of the structures illustrated herein may be employed without departing from the principles described herein, wherein:

FIG. 22 is a perspective view of another exemplary embodiment of the lead drive shaft according to the present disclosure;

FIG. 23 is a cross-sectional view of a portion of the lead drive shaft of FIG. 22, taken from line 23-23;

DETAILED DESCRIPTION

The portable, battery-powered, hand-held tools contemplated by the present disclosure include crimping tools that crimp one or more conductors to an object and cutting tools used to cut one or more conductors. The present disclosure will be shown and described in connection with portable, battery-powered, hand-held tools with an in-line handle design. However, handle design of the portable, battery-powered, hand-held tool may be a pistol grip design, a suitcase design or other type handle design. The present disclosure will also be shown and described in connection with a crimping tool. However, the crimping jaws of the tool may be substituted with cutting jaws to create a cutting tool.

For ease of description, the portable, battery-powered, crimping tools according to the present disclosure may also be referred to as the "tools" in the plural and the "tool" in the singular. The objects crimped by the crimping tool may also be referred to herein as the "wire terminations" in plural and the "wire termination" in the singular. Non-limiting examples of the wire terminations include lugs and splices. The conductors, cables, wires or objects to be crimped within the wire terminations or cut by the tools of the present disclosure may also be referred to as the "conductors" in the plural and the "conductor" in the singular. In addition, as used in the present disclosure, the terms "front," "rear," "upper," "lower," "upwardly," "downwardly," "proximal," "distal" and other orientation descriptors are intended to facilitate the description of the exemplary embodiments disclosed herein and are not intended to limit the structure of the exemplary embodiments or limit the claims to any particular position or orientation.

Figure 1:
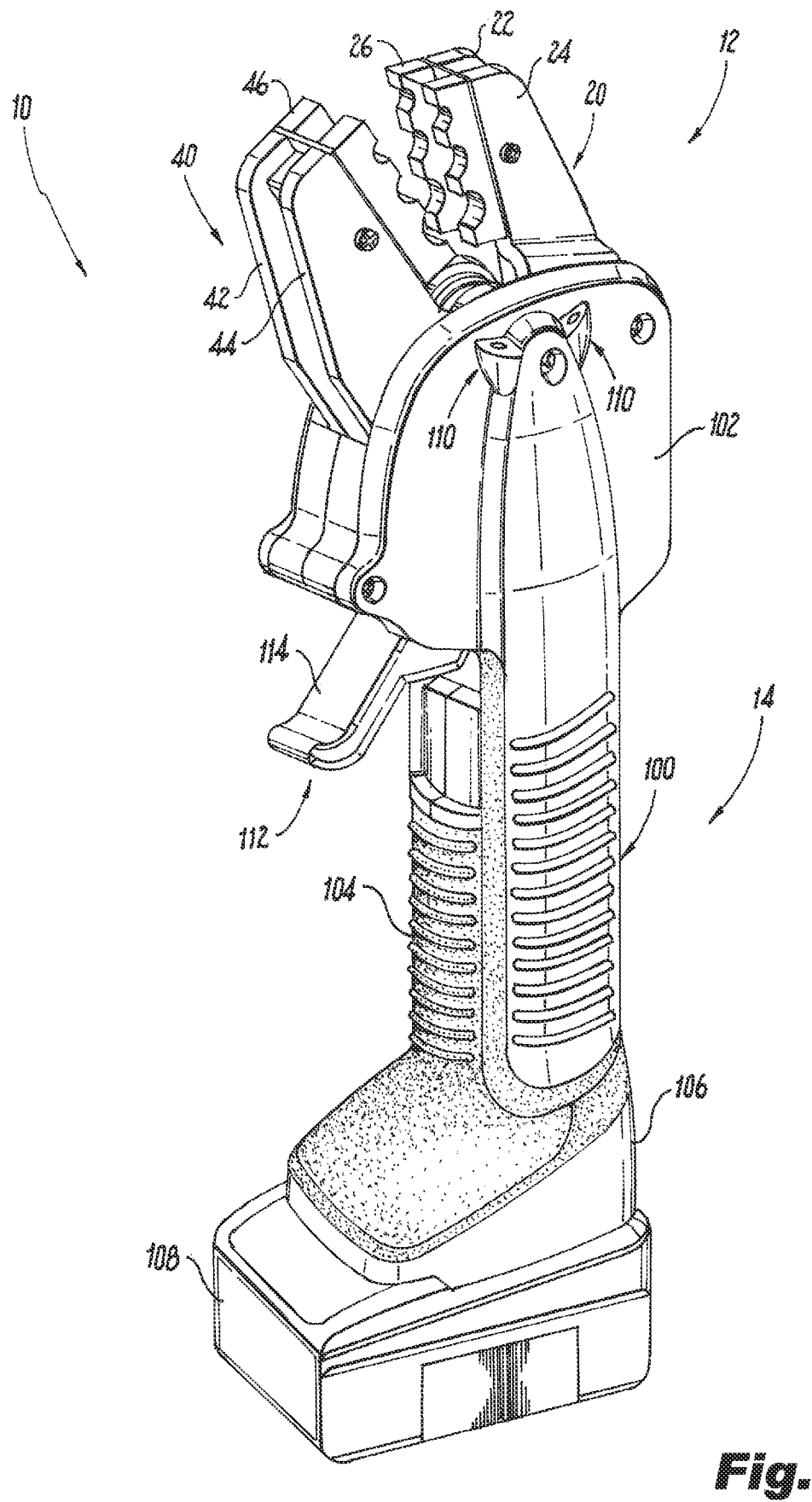
FIG. 1 is a side perspective view of a first side of an exemplary embodiment of a battery-powered tool according to the present disclosure, illustrating a working head assembly and a handle assembly.
Figure 2:
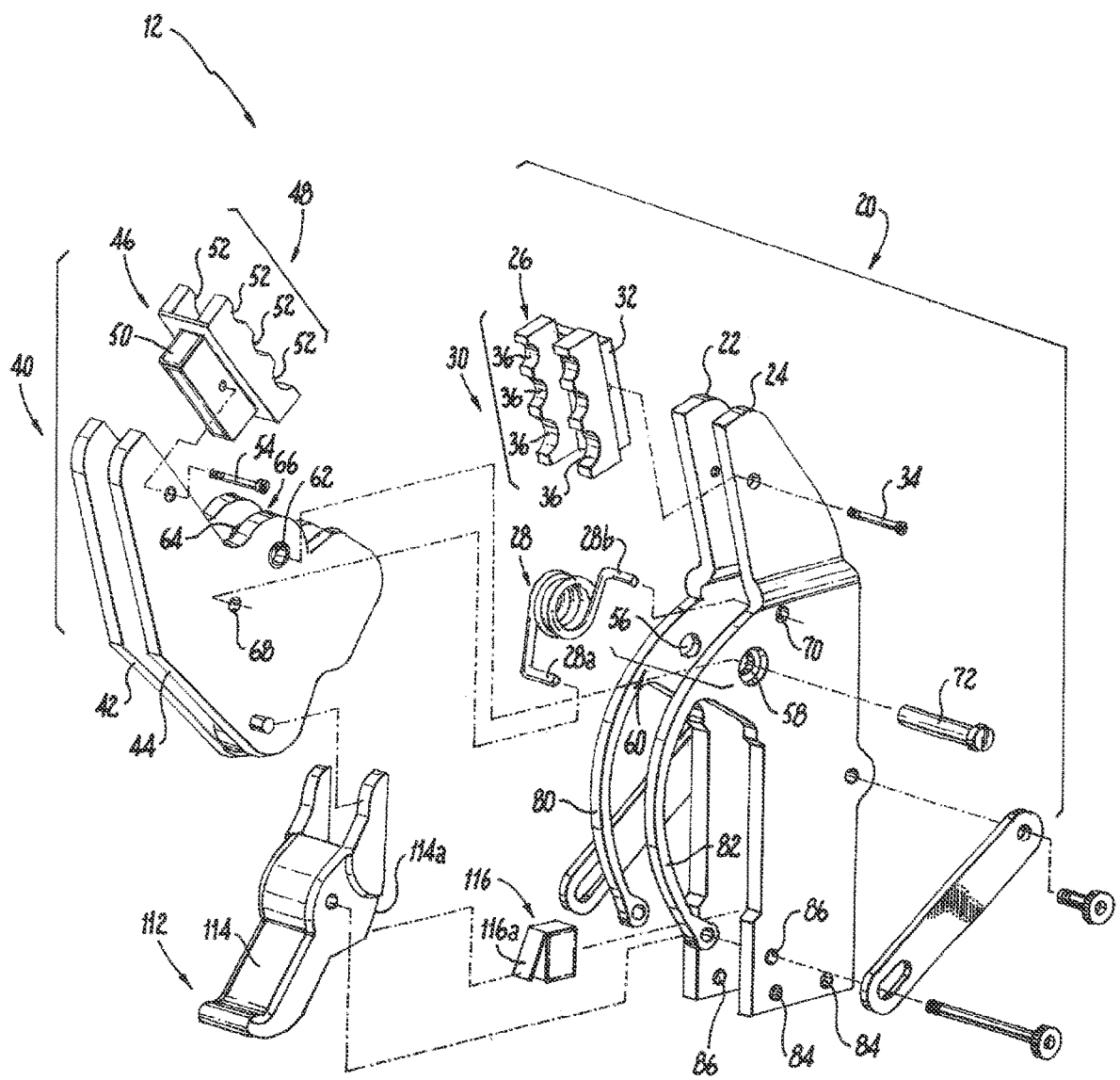
FIG. 2 is an exploded perspective view of an exemplary embodiment of jaw assemblies of the tool according to the present disclosure.

Referring to FIGS. 1 and 2, a battery-powered, hand-held crimping tool 10 according to the present disclosure is shown. The tool 10 includes a working head assembly 12 and a handle assembly 14. The working head assembly 12 includes a first jaw assembly 20 and a second jaw assembly 40. A biasing member 28 is used to automatically bias the second jaw assembly 40 in a direction away from the first jaw assembly 20. The first jaw assembly 20 includes a first jaw plate 22, a second jaw plate 24, a die 26. The first jaw plate 22 and second jaw plate 24 are aligned in parallel and spaced apart, as shown in FIG. 2. In this exemplary embodiment, the die 26 includes one or more impinging regions 30 and a mounting member 32. Each of the one or more impinging regions 30 may include one or more impacting surfaces 36, each surface being configured and dimensioned to receive a barrel portion of a wire termination (not shown). The die 26 is secured to the first and second jaw plates 22 and 24 by positioning the mounting member 32 between the first and second jaw plates so that a fastener 34, e.g., a bolt, can be passed through apertures in the plates 22 and 24 and the mounting member 32, as shown, and tightened. The second jaw assembly 40 includes a first jaw plate 42, a second jaw plate 44 and die 46. The first jaw plate 42 and second jaw plate 44 are aligned in parallel and spaced apart, as shown in FIG. 2. In this exemplary embodiment, the die 46 includes one or more impinging regions 48 and a mounting member 50. Each of the one or more impinging regions 48 may include one or more impacting surfaces 52, each surface 52 being configured and dimensioned to receive a barrel portion of a wire termination (not shown). The die 46 is secured to the first and second jaw plates 42 and 44 by positioning the mounting member 50 between the first and second jaw plates 42 and 44 so that a fastener 54, e.g., a bolt, can be passed through apertures in the plates 42 and 44 and the mounting member 50, as shown, and tightened.

Continuing to refer to FIGS. 1 and 2, the second jaw assembly 40 is operatively coupled to the first jaw assembly 20 so that the second jaw assembly 40 is movable relative to the first jaw assembly 20. Various known techniques may be used to couple the jaw assemblies 20 and 40. For example, in the embodiment of FIG. 2, a tang and clevis type configuration is used, where a portion of the first and second jaw plates 22 and 24 include through apertures 56 and 58 acting as a clevis 60, and portion of the first and second jaw plates 42 and 44 include apertures 62 and 64 acting as a tang 66. In this exemplary embodiment, the biasing member 28, e.g., a helical torsion spring, is positioned within the tang 66 of the second jaw assembly 40 so that a central opening of the biasing member 28 is aligned with the apertures 62 and 64 in the tang 66. One end 28a of the biasing member 28 is inserted into a spring aperture 68 in the second jaw plate 44 of the second jaw assembly 40 to couple the biasing member 28 to the second jaw assembly 40. The tang 66 is then positioned between the clevis 60 of the first jaw assembly 20, and another end 28b of the biasing member 28 is inserted into a spring aperture 70 in the second jaw plate 24 of the first jaw assembly 20 to couple the biasing member 28 to the first jaw assembly 20. With the tang 66 aligned with the clevis 60, a bolt 72 is passed through the clevis apertures 56 and 58, the tang apertures 62 and 64, and the central opening of the biasing member 28 to movably secure the second jaw assembly 40 to the first jaw assembly 20. In this exemplary embodiment, the second jaw assembly 40 pivots relative to the first jaw assembly 20 where the bolt 72 acts as the pivot pin. As noted above, the biasing member 28 normally biases the second jaw assembly 40 in a direction away from the first jaw assembly 20.

Figure 3:
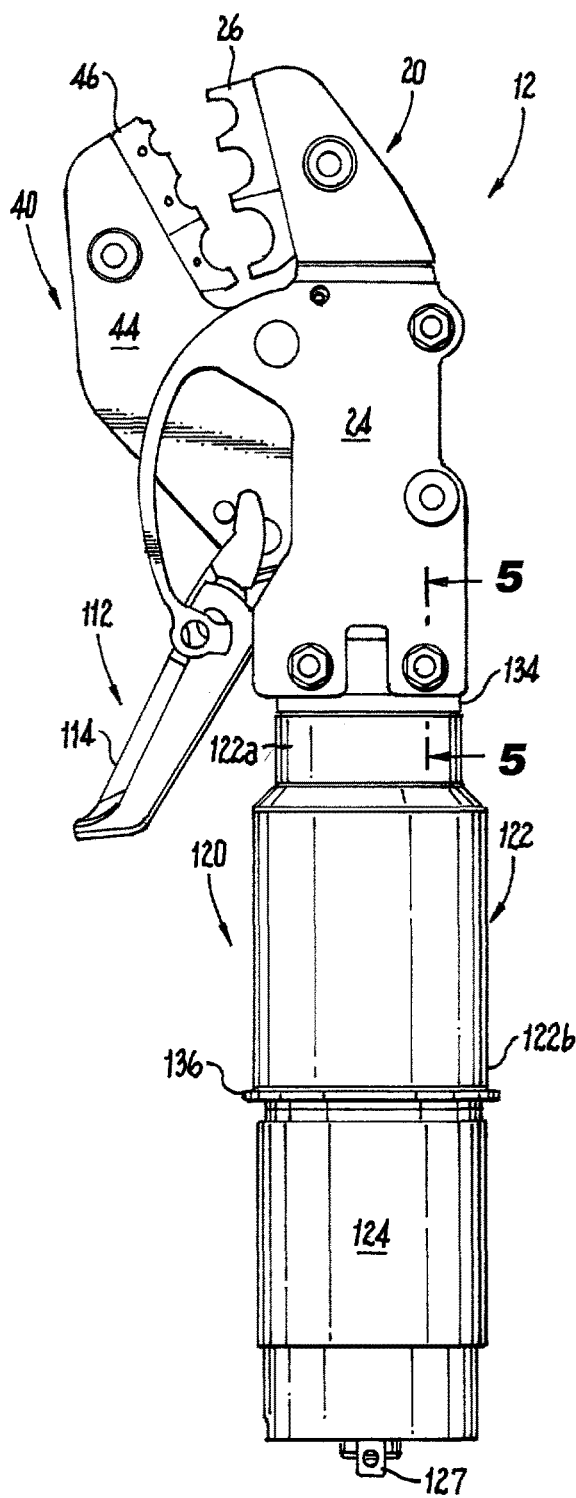
FIG. 3 is a side elevation view of the tool of FIG. 1 with the outer housing of the tool removed.

Referring now to FIGS. 1 and 3, the handle assembly 14 houses a drive assembly and one or more electrical controls used to activate and deactivate the tool 10. In the exemplary embodiment shown, the handle assembly 14 includes a housing 100, seen in FIG. 1, and the drive assembly 120, seen in FIG. 3. The housing 100 is configured and dimensioned to enclose or wrap around the drive assembly 120 and a proximal portion of the working head assembly 12. More specifically, the distal end of the housing 100 is a head portion 102 configured and dimensioned to enclose a portion of the jaw assemblies 20 and 40. An intermediate portion of the housing 100 is a grip portion 104 that is configured and dimensioned to enclose the drive assembly 120. The proximal end of the housing 100 is an end portion 106 configured and dimensioned to receive a portion of a battery 108 and to house the components used to connect the battery 108 to the housing 100 using, for example, known battery clips. The head portion 102 of the housing 100 may also include one or more lights 110, e.g., LEDs, used to illuminate an area between the first and second jaw assemblies 20 and 40 when, for example, the tool 10 is activated.

Figure 4:
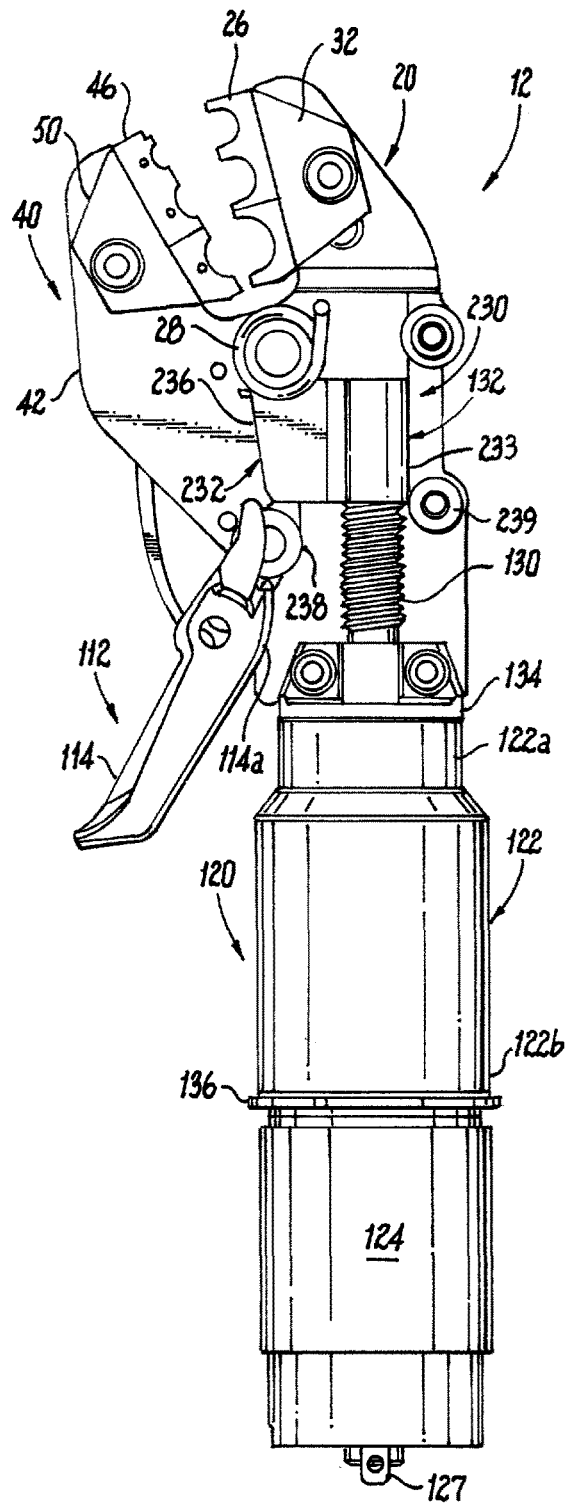
FIG. 4 is the side elevation view of tool of FIG. 3, illustrating one of the movable jaws of a jaw assembly removed to reveal a jaw drive member coupled to a lead drive shaft used to move the movable jaw assembly.

In the exemplary embodiment shown, the battery 108 is removably connected to the end portion 106 of the housing 100. In another embodiment, the battery 108 could be removably mounted or connected to any suitable position on the housing 100. In another embodiment, the battery 108 may be affixed to the housing 100 so that it is not removable. The battery 108 shown is a rechargeable battery, such as a lithium ion battery, that can output a voltage of at least 16 VDC, and preferably in the range of between about 16 VDC and about 24 VDC. The battery 108 provides power to a motor 124 in the drive assembly 120 via electrical contacts 127 on the motor. To activate the motor and possibly the lights 110, if used, one or more operator control assemblies 112 may be used. In the exemplary embodiment shown, the one or more operator controls 112 may include a trigger 114 and a switch 116, seen in FIG. 2. In this exemplary embodiment, the trigger 114 pivotally connected to a spring arm 80 extending from the first jaw plate 22 of the first jaw assembly 20 and to a spring arm 82 extending from the second jaw plate 24 of the first jaw assembly 20. The switch 116 may be, for example a single pole micro-switch, that operatively interacts with a camming surface 114a of the trigger 114, seen in FIG. 4. The switch 116 is electrically connected between the battery 108, the motor 124 and the one or more lights 110 such that when the trigger 114 is depressed to a point where the camming surface 114a of the trigger 114 contacts and depresses the switch arm 116a, the switch 116 turns "on" causing the motor 124 to activate and the one or more lights 110 to turn "on" illuminating the area between the first and second jaw assemblies 20 and 40.

Figure 6:
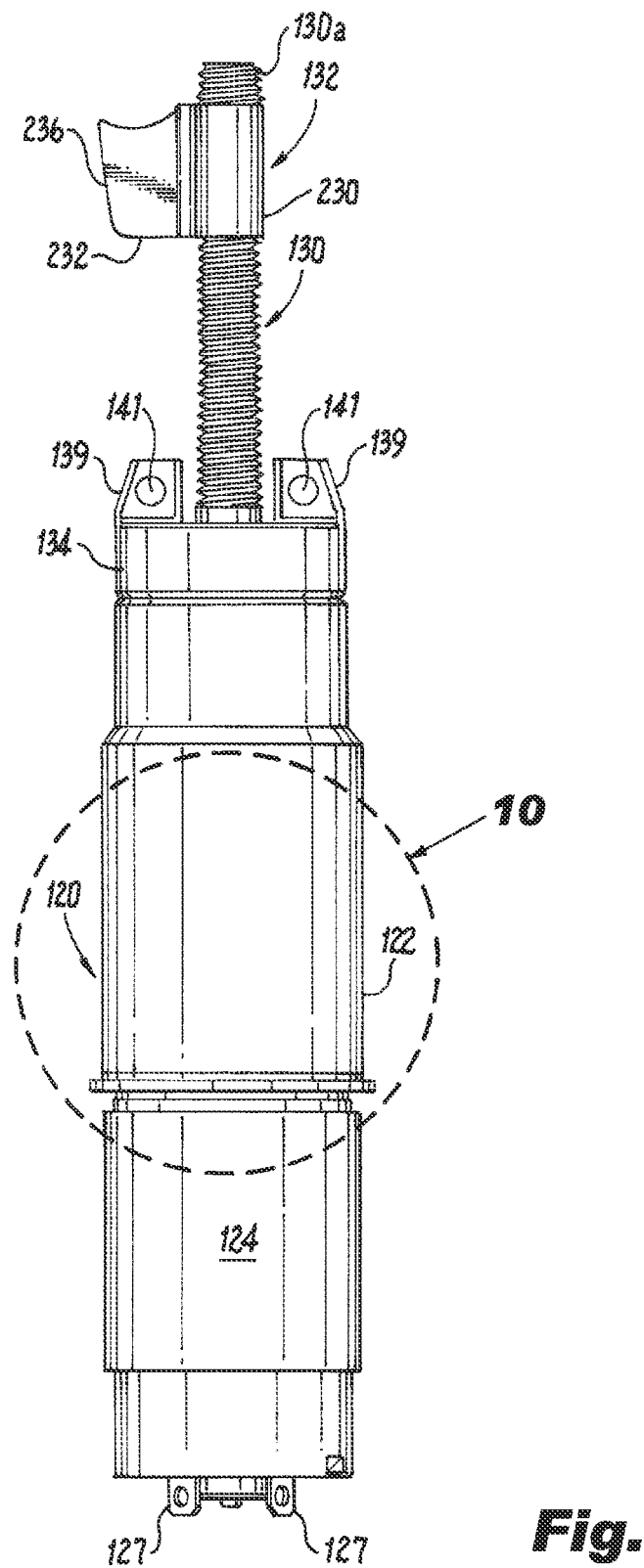
FIG. 6 is the side elevation view of the tool of FIG. 3, illustrating the pair of jaw assemblies removed to reveal the jaw drive member coupled to the lead drive shaft used to move at least one of the jaw assemblies.

Turning now to FIGS. 6-13, an exemplary embodiment of the drive assembly (or system) 120 according to the present disclosure is shown. The drive assembly 120 includes the motor 124, a gear assembly 126, a bearing system 128, a lead drive shaft 130, and a jaw drive member 132. A drive assembly housing 122 holds or encases the gear assembly 126 and the bearing system 128. Extending from a distal end portion 122a of the drive assembly housing 122 and operatively coupled to the gear assembly 126 is the lead drive shaft 130, seen in FIG. 11. In this exemplary embodiment, the lead drive shaft 130 includes a distal end portion 130a, a proximal end portion 130b and an intermediate portion 130c between the distal end portion 130a and the proximal end portion 130b. The distal end portion 130a is threaded with, for example, buttress threads typically used for one-directional loading on the lead drive shaft 130, or acme threads typically used for bi-directional loading on the lead drive shaft 130. The proximal end portion 130b of the lead drive shaft 130 is threaded with, for example, conventional machine screw threads. At the tip of the proximal end portion 130b of the lead drive shaft 130 is a spline or key 130d, seen in FIGS. 8 and 9, that interacts with the gear assembly 126. In the exemplary embodiment shown, the spline 130d is a hex shaped member that interacts with a hex shape keyway 201 in the gear assembly 126. The intermediate portion 130c of the lead drive shaft 130 has a smooth exterior surface with an outside diameter that is substantially the same as the outside diameter of the distal end portion 130a. The jaw drive member 132, seen in FIG. 6, is movably coupled to a distal end portion 130a of the lead drive shaft 130 as described in more detail below with reference to FIGS. 6 and 11.

Figure 5:
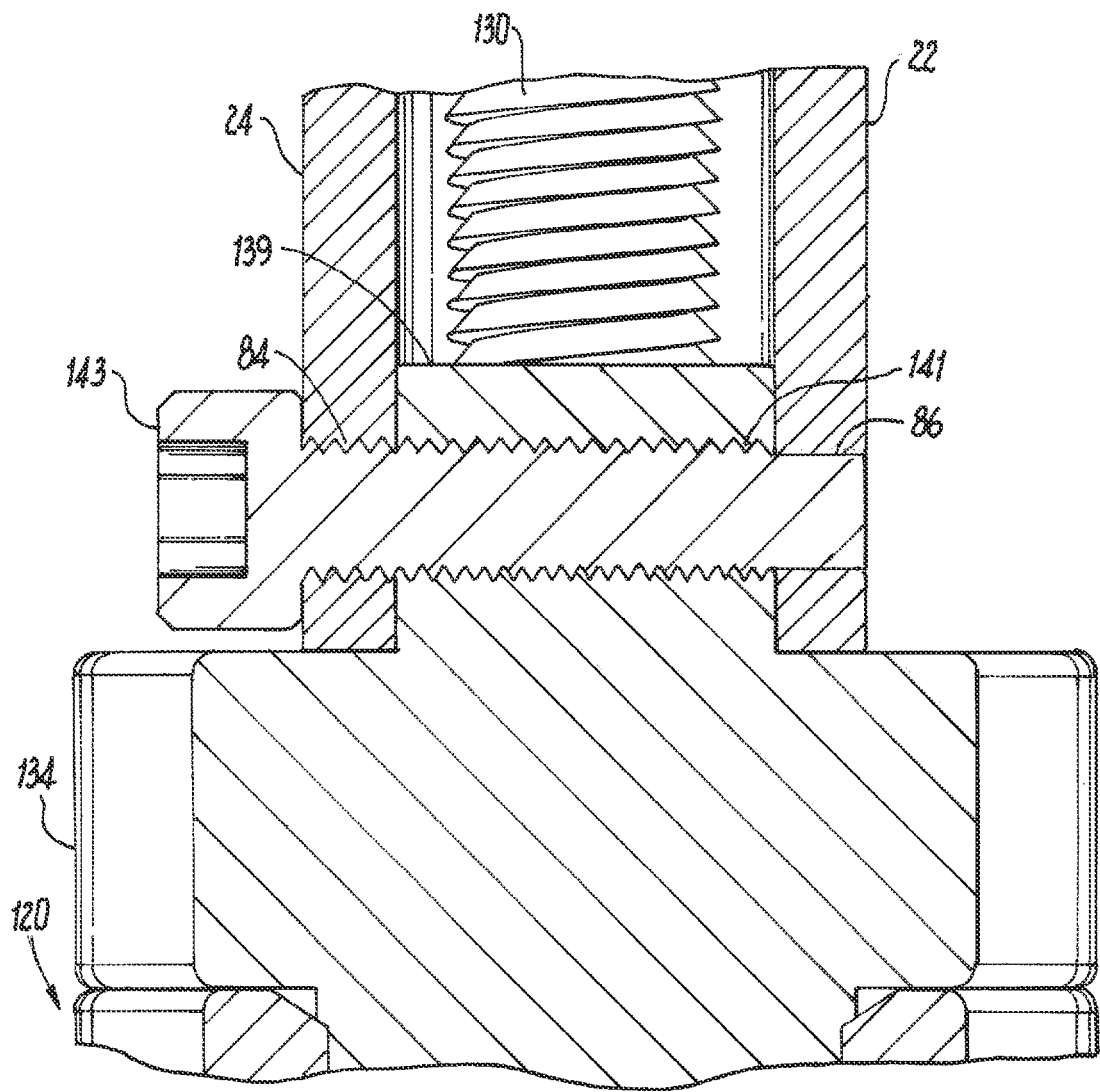
FIG. 5 is a partial cross-sectional view of the tool of FIG. 3 taken from line 5-5.
Figure 9:
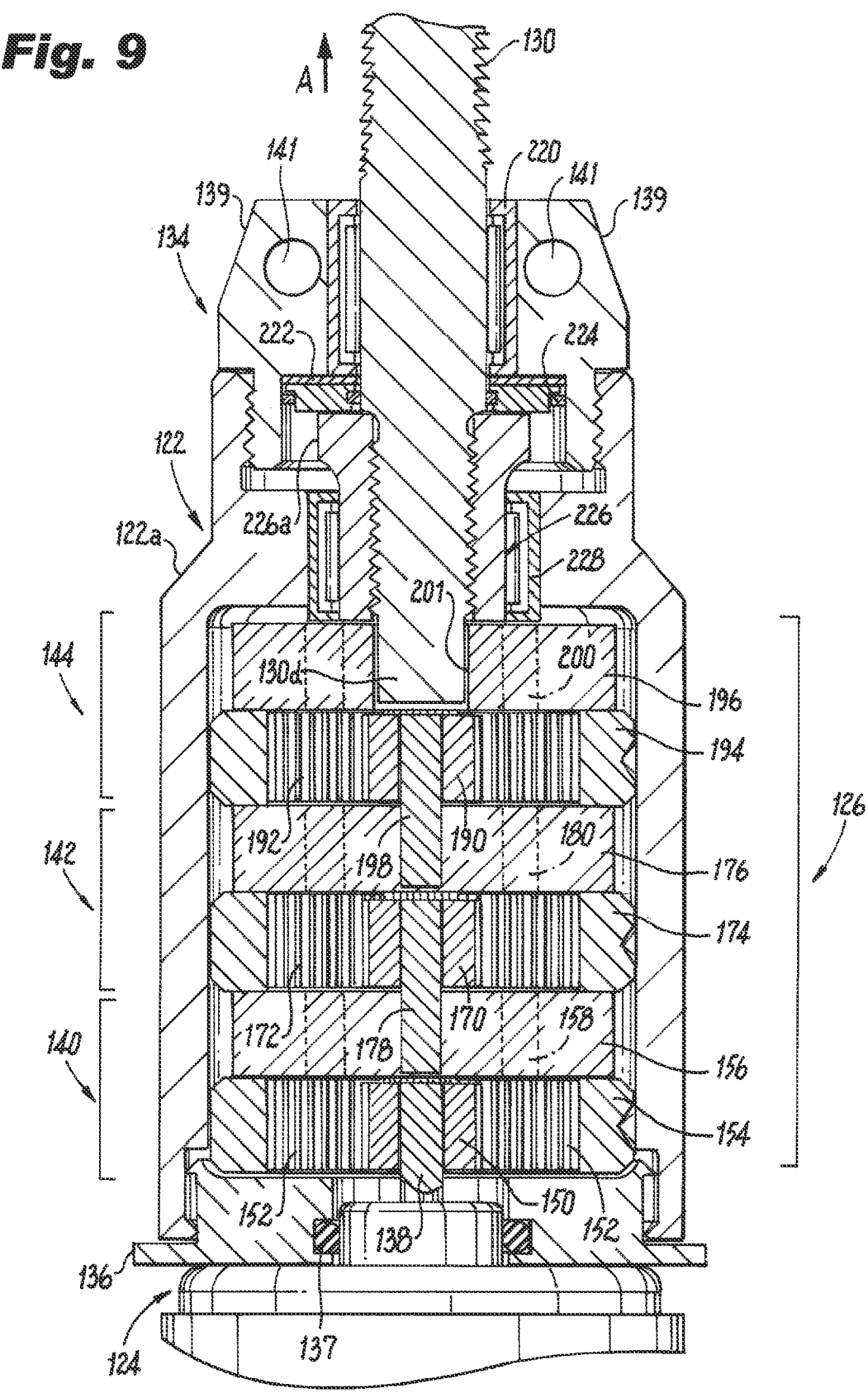
FIG. 9 is a cross-sectional view of a portion of the tool frame of FIG. 6 taken along line 9-9, illustrating the bearing system and the gear assembly within the drive assembly housing and a portion of the motor connected to the drive assembly housing.
Figure 11:
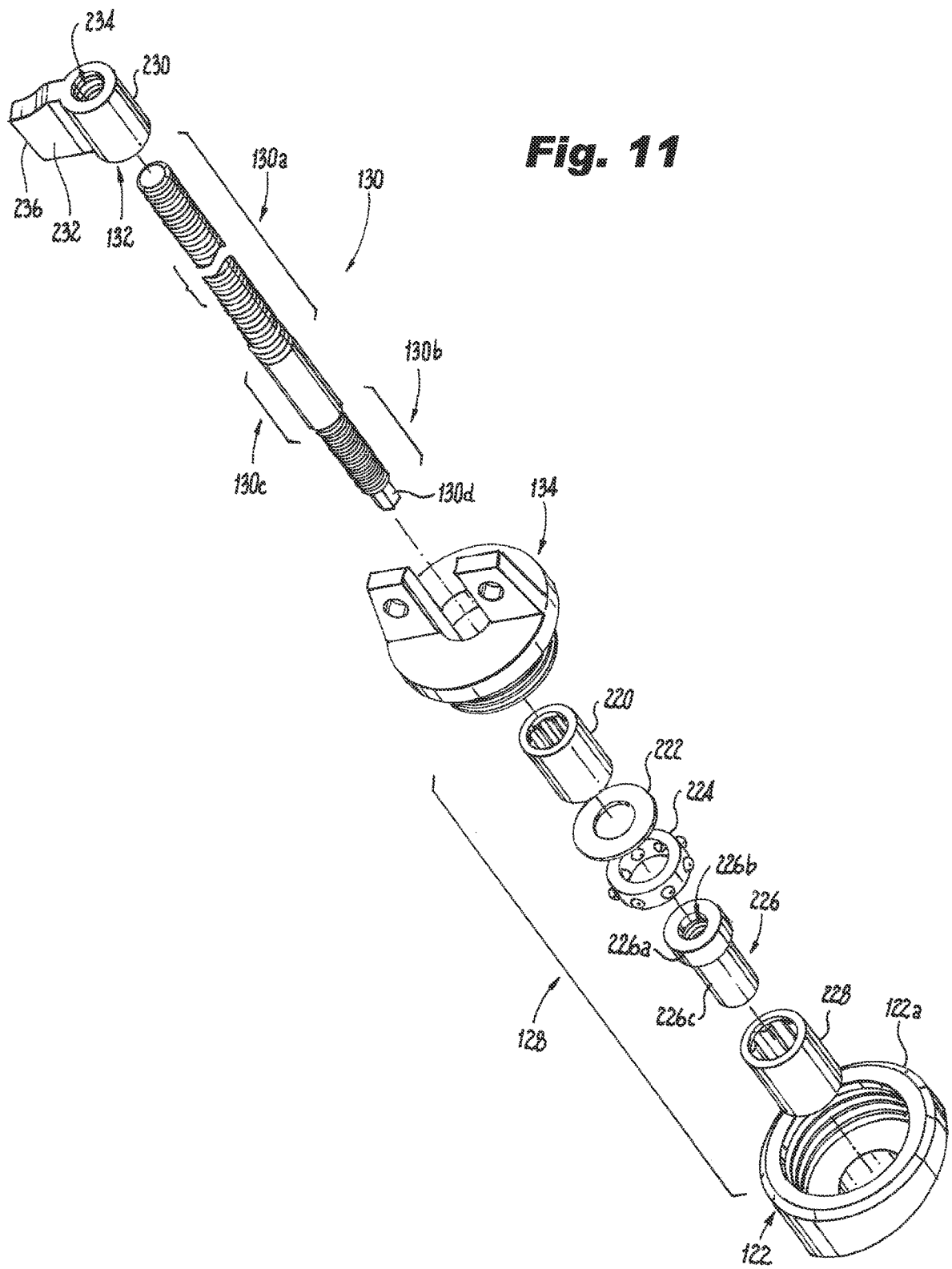
FIG. 11 is an exploded perspective view of an exemplary embodiment of a bearing system according to the present disclosure.

The proximal end portion 130b of the lead drive shaft 130 is secured within the distal end portion 122a of the drive assembly housing 122 by the bearing system 128 and an end cap 134 of the drive assembly housing 122, seen in FIGS. 9 and 11. The end cap 134 is secured to the distal end portion 122a of the drive assembly housing 122 by a mechanical connection. In the exemplary embodiment shown in FIGS. 9 and 11, the mechanical connection is a threaded connection, where threading on the end cap 134 is screwed into threading in the drive assembly housing 122. However, other mechanical connections are contemplated, including snap-fit and press-fit connections where the end cap 134 is snapped or pressed within the drive assembly housing 122, set screw connections where set screws secures the end cap 134 to the drive assembly housing 122, and welds. The end cap 134 of the drive assembly housing 122 includes a pair of tabs 139, each having a mounting aperture 141. The mounting apertures 141 are positioned to align with corresponding mounting apertures 84 and 86 in the first and second jaw plates 22 and 24 of the first jaw assembly 20, seen in FIG. 2. The first and second jaw plates can then be secured to the tabs 139 of the end cap 134 using bolts 143, as shown in FIG. 5.

Figure 7:
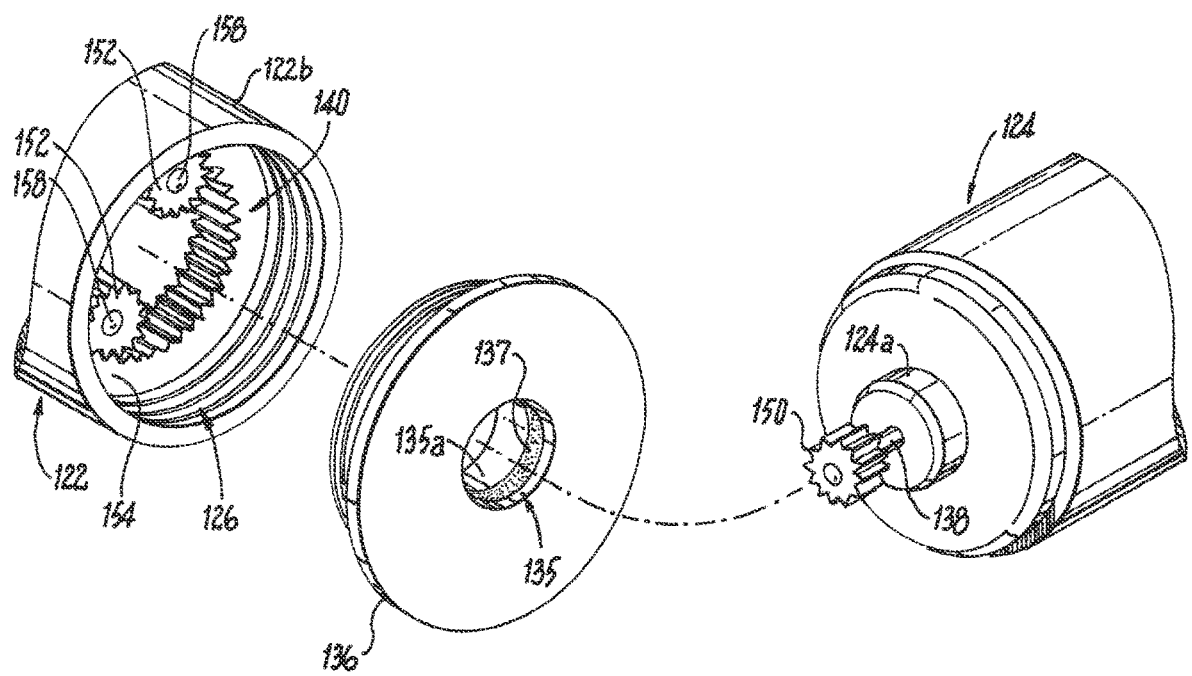
FIG. 7 is an exploded perspective view of a proximal end of the drive assembly housing of FIG. 6, illustrating the motor separated from the drive assembly housing and the end cap of the drive assembly housing removed to reveal a portion of the gear assembly within the drive assembly housing.
Figure 8:
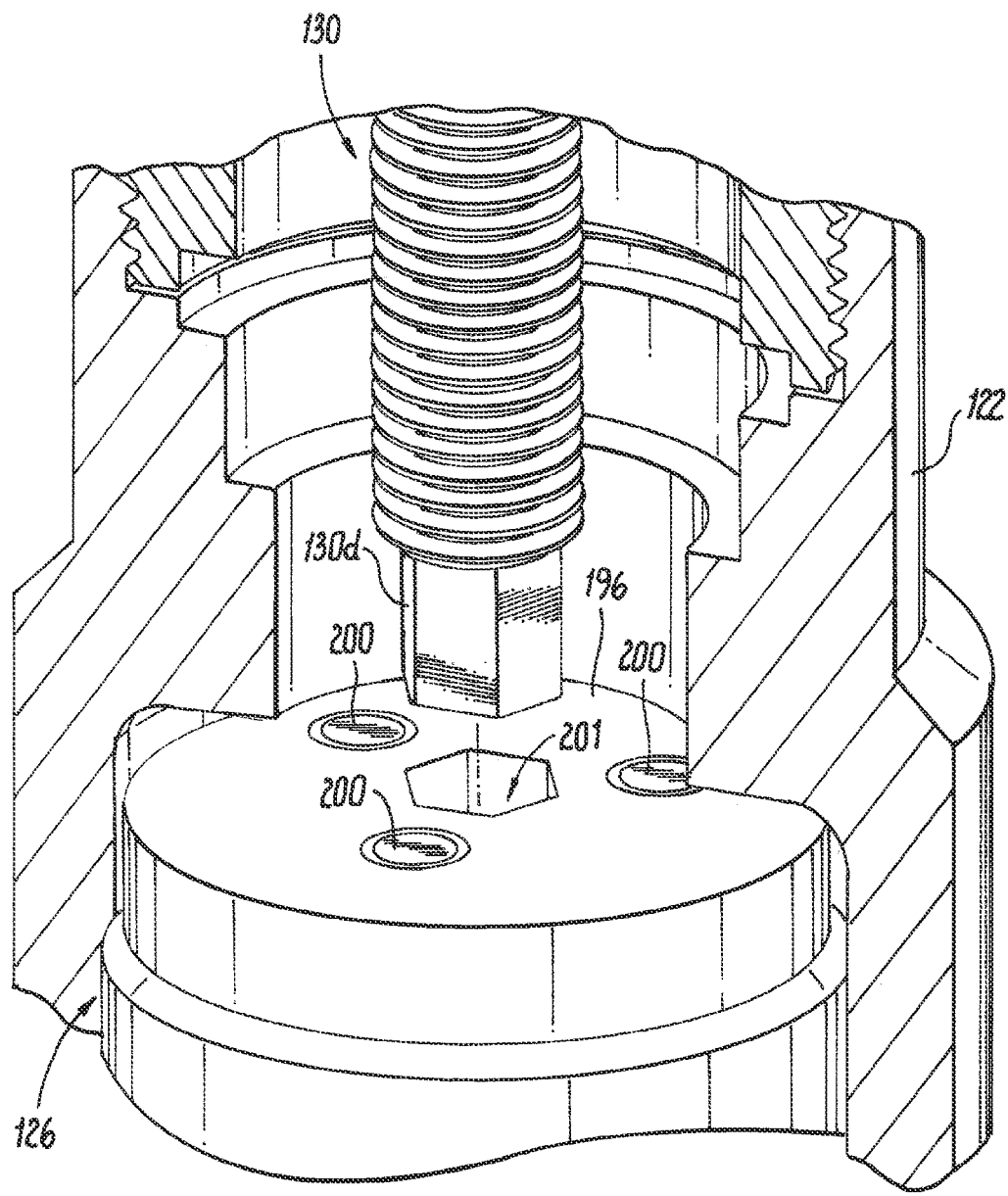
FIG. 8 is an enlarged cross-sectional view of the interior of the drive assembly housing of FIG. 6 with the bearing system removed to illustrate a connection between the lead drive shaft and the gear assembly.

Referring to FIGS. 6, 7 and 9, extending from a proximal end portion 122b of the drive assembly housing 122 and operatively coupled to the gear assembly 126 is the motor 124. The motor 124 is secured to the proximal end portion 122b of the drive assembly housing 122 via an end cap 136, seen in FIGS. 7 and 9. The end cap 136 is secured to the proximal end portion 122b of the drive assembly housing 122 by a mechanical connection. In the exemplary embodiment shown in FIGS. 7 and 9, the mechanical connection is preferably a threaded connection between the end cap 136 and the drive assembly housing 122. However, other mechanical connections are contemplated, including annular or cantilever snap-fit connections, press-fit connections, set screw connections and welds. The motor 124 is secured to the end cap 136 by a mechanical connection. In the exemplary embodiment shown in FIGS. 7 and 9, the mechanical connection is a press-fit connection between the proximal end 124a of the motor 124 passing through a central opening 135 in the end cap 136 and an interior surface 135a of the central opening 135. However, other mechanical connections are contemplated, including snap-fit connections, set screw connections and welds. A sealing member 137, e.g., an O-ring, may be positioned within the central opening 135 of the end cap 136 to seal the connection between motor 124 and the end cap 136.

Generally, the motor 124 rotates a motor drive shaft 138, seen in FIG. 7, that is coupled to the gear assembly 126. The gear assembly 126 reduces the rate of rotation of the motor drive shaft 138. The lead drive shaft 130 is coupled to the gear assembly 126 and rotates at the output rate of the gear assembly. The bearing system 128 is provided so that the lead drive shaft 130 can withstand radial and axial loads generated during an operation of the jaw assemblies 20 and 40. As an example, the motor 124 may be configured to rotate the motor drive shaft 138 at a rate in the range of about 15,000 rpm and about 21,000 rpm with an output torque in the range of about 0.4 in-lb. and about 0.8 in-lb. In this configuration, the motor current may be in the range of about 6 amps and about 15 amps, the battery voltage may be in the range of about 16 VDC and about 24 VDC, and the output motor power may be in the range of about 95 watts and about 160 watts. The gear assembly 126 may reduce the rate of rotation of the motor drive shaft 138 to a range of about 375 rpm and about 1400 rpm. As such, the gear ratio of the gear assembly 126 may be in the range of about 15:1 and about 40:1. The output of the gear assembly 126 is transferred to the lead drive shaft 130. In this exemplary embodiment, the lead drive shaft 130 is a threaded shaft having a diameter in a range of about 0.35 inches and about 0.50 inches, with a lead, e.g., a screw lead, in a range of about 0.071 inches and about 0.125 inches. Under the motor operating configuration described above, the efficiency of the gear assembly 126 may be in the range of about 11% and about 61%, and the pull force of the lead drive shaft 130 may be in the range of about 200 lbs. and about 400 lbs. Movement of the lead drive shaft 130 is transferred to the jaw drive member 132. In the exemplary embodiment of the present disclosure, the output of the gear assembly 126 is rotational motion which is transferred to the lead drive shaft 130. Rotation of the lead drive shaft 130 is translated to linear movement of the jaw drive member 132. With a pull force of the lead drive shaft 130 in the exemplary range of about 200 lbs. and about 400 lbs., the linear travel distance of the jaw drive member 132 may be in the range of about 0.6 inches and about 0.9 inches. Linear movement of the jaw drive member 132 moves the second jaw assembly 40 toward the first jaw assembly 20 when crimping a wire termination positioned between the first and second jaw assemblies. It is noted that with the gear assembly 126 reducing the rate of rotation of the motor drive shaft 138 to a range of about 375 rpm and about 1400 rpm, the total crimp cycle of the tool 10 may be in the range of about 0.4 seconds and about 2.0 seconds.

As another example, the motor 124 may be configured to rotate the motor drive shaft 138 at a rate in the range of about 19,000 rpm and about 21,000 rpm with an output torque in the range of about 0.49 in-lb. and about 0.69 in-lb. In this exemplary embodiment, the motor current may be in the range of about 9 amps and about 12 amps, the battery voltage may be in the range of about 16 VDC and about 22 VDC, and the output motor power may be in the range of about 120 watts and about 160 watts. The gear assembly 126 may reduce the rate of rotation of the motor drive shaft 138 to a range of about 600 rpm and about 1200 rpm. As such, the gear ratio of the gear assembly 126 may be in the range of about 18:1 and about 33:1. As noted, the output of the gear assembly 126 is transferred to the lead drive shaft 130. In this exemplary embodiment, the lead drive shaft 130 is a threaded shaft having a diameter in a range of about 0.35 inches and about 0.4 inches, with a lead, e.g., a screw lead, in a range of about 0.075 inches and about 0.1 inches. Under the motor operating configuration described above, the efficiency of the gear assembly 126 may be in the range of about 20% and about 52%, and the pull force of the lead drive shaft 130 may be in the range of about 288 lbs. and about 377 lbs. Movement of the lead drive shaft 130 is transferred to the jaw drive member 132. In this exemplary embodiment of the present disclosure, the output of the gear assembly 126 is rotational motion which is transferred to the lead drive shaft 130. Rotation of the lead drive shaft 130 is translated to linear movement of the jaw drive member 132. With a pull force of the lead drive shaft 130 in the exemplary range of about 288 lbs. and about 377 lbs., the linear travel distance of the jaw drive member 132 may be in the range of about 0.65 inches and about 0.85 inches. Linear movement of the jaw drive member 132 moves the second jaw assembly 40 toward the first jaw assembly 20 when crimping a wire termination positioned between the first and second jaw assemblies. It is noted that with the gear assembly 126 reducing the rate of rotation of the motor drive shaft 138 to a range of about 600 rpm and about 1200 rpm, the total crimp cycle of the tool 10 may be in the range of about 0.4 seconds and about 0.9 seconds.

As described above, in the exemplary embodiment shown, the motor 124 is electrically connected to the battery 108 and the switch 116, seen in FIG. 2, and its operation is controlled by the trigger 114. Generally, the motor 108 is adapted to operate at a nominal voltage corresponding to the voltage of the battery 108, e.g., between about 16 VDC and about 24 VDC. For example, if the battery 108 is adapted to output a voltage of about 18 VDC, then the motor 108 would be adapted to operate at a voltage of about 18 VDC. Under a no-load condition, such a motor 108 can operate at about 22,000 rpm with a current of about 0.2 amps. At maximum efficiency, the motor 108 can operate in a range of about 18,000 rpm to about 20,000 rpm with a current in a range of about 10 amps and about 12 amps, a torque of about 0.4 in-lb., and an output wattage in a range of about 95 W and about 135 W.

Figure 10:
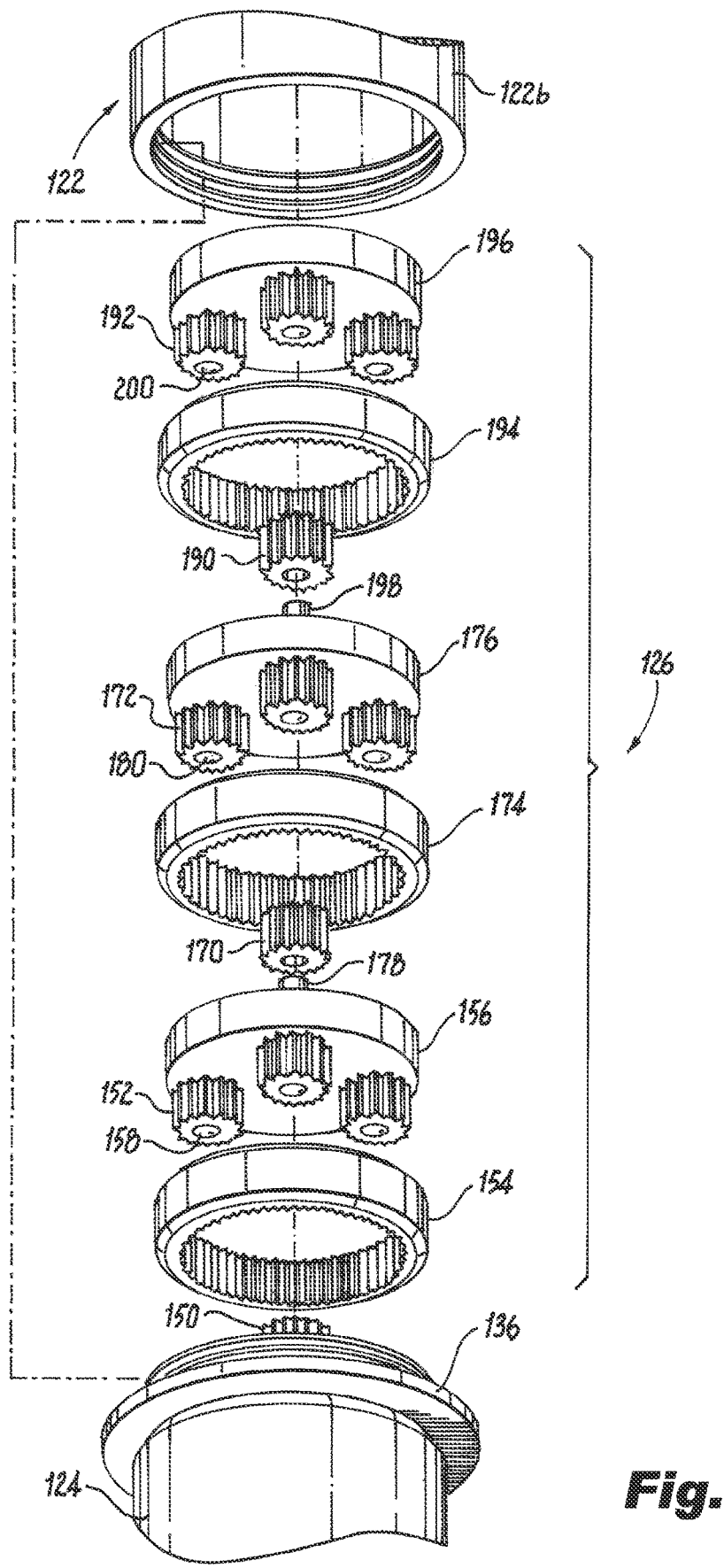
FIG. 10 is an exploded bottom perspective view of an exemplary embodiment of a gear assembly according to the present disclosure.

Turning now to FIGS. 9 and 10, an exemplary embodiment of the gear assembly 126 according to the present disclosure will be described. In this exemplary embodiment, the gear assembly 126 is a multi-stage gear assembly. Each stage in the gear assembly is a planetary gear assembly that includes a pinion gear, two or more planetary gears, a ring gear and a carrier plate. As an example, in the exemplary embodiment shown there are three planetary gear assemblies. A first planetary gear assembly 140 is a first stage (or an input stage), a second planetary gear assembly 142 is a second stage (or an intermediate stage) and a third planetary gear assembly 144 is a third stage (or an output stage). The first planetary gear assembly 140 includes a pinion gear 150, three planetary gears 152, a ring gear 154 and a carrier plate 156. The pinion gear 150 is attached to the drive shaft 138 of the motor 124. The planetary gears 152 are attached to shafts 158 extending from one side of the carrier plate 156 so that the planetary gears 152 are rotatable relative to their corresponding shaft 158. The shafts 158 are arranged on the carrier plate 156 so that the planetary gears 152 are spaced apart and independent of each other. The carrier plate 156 is positioned adjacent the ring gear 154 so that the teeth of the planetary gears 152 intermesh with the teeth of the ring gear 154. The pinion gear 150 is positioned within the ring gear 154 between the planetary gears 152 so that the teeth of the pinion gear 150 intermesh with the teeth of the planetary gears 152.

Continuing to refer to FIGS. 9 and 10, the second planetary gear assembly 142 includes a pinion gear 170, three planetary gears 172, a ring gear 174 and a carrier plate 176. The pinion gear 170 is attached to a shaft 178 extending from a side of the carrier plate 156 that is opposite the planetary gears 152. The planetary gears 172 are attached to shafts 180 extending from one side of the carrier plate 176 so that the planetary gears 172 are rotatable relative to their corresponding shaft 180. The shafts 180 are arranged on the carrier plate 176 so that the planetary gears 172 are spaced apart and independent of each other. The carrier plate 176 is positioned adjacent the ring gear 174 so that the teeth of the planetary gears 172 intermesh with the teeth of the ring gear 174. The pinion gear 170 is positioned within the ring gear 174 between the planetary gears 172 so that the teeth of the pinion gear 170 intermesh with the teeth of the planetary gears 172.

The third planetary gear assembly 144 includes a pinion gear 190, three planetary gears 192, a ring gear 194 and a carrier plate 196. The pinion gear 190 is attached to a shaft 198 extending from a side of the carrier plate 176 that is opposite the planetary gears 172. The planetary gears 192 are attached to shafts 200 extending from one side of the carrier plate 196 so that the planetary gears 192 are rotatable relative to their corresponding shaft 200. The shafts 200 are arranged on the carrier plate 196 so that the planetary gears 192 are spaced apart and independent of each other. The carrier plate 196 is positioned adjacent the ring gear 194 so that the teeth of the planetary gears 192 intermesh with the teeth of the ring gear 194. The pinion gear 190 is positioned within the ring gear 194 between the planetary gears 192 so that the teeth of the pinion gear 190 intermesh with the teeth of the planetary gears 192. As noted above, the proximal end portion 130b of the lead drive shaft 130 has a spline or key 130d, seen in FIGS. 8 and 9, that interacts with the gear assembly 126. In the exemplary embodiment shown, the spline 130d is a hex shaped member that interacts with a hex shape keyway 201 in the carrier plate 196 of the third planetary gear assembly 144.

Figure 12:
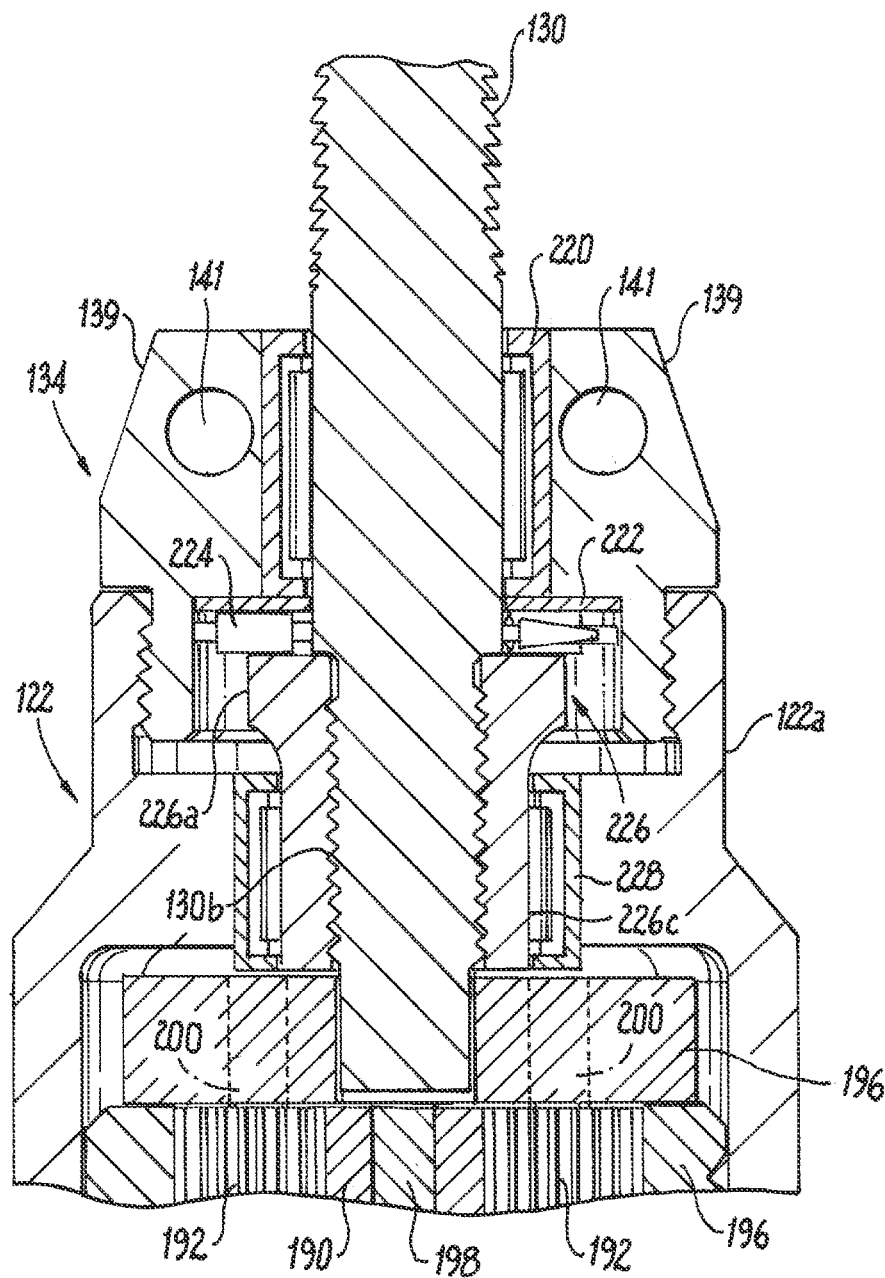
FIG. 12 is an enlarged cross-sectional view of the bearing system of FIG. 11 installed within the drive assembly housing.

Referring now to FIGS. 11 and 12, an exemplary embodiment of a bearing system 128 according to the present disclosure is shown. The bearing system 128 is provided so that the drive assembly 120 can withstand radial and axial (or thrust) loads as the lead drive shaft 130 is rotated during an operation of the tool 10. The bearing system 128 is positioned within the distal end portion 122a of the drive assembly housing 122 adjacent the gear assembly 126 and is held within the drive assembly housing 127 by the end cap 134. In the exemplary embodiment shown, the bearing system 128 includes an upper radial bearing 220, a thrust washer 222, a thrust bearing 224, a flange bushing 226 and a lower radial bearing 228. The flange bushing 226 has an upper portion 226a with wider diameter that provides a platform on which the thrust bearing 224 can sit. The flange bushing 226 has a center bore 226b, seen in FIG. 11, that is preferably threaded so that the flange bushing 226 can be threaded onto the proximal end portion 130b of the lead drive shaft 130, as shown in FIG. 12. The flange bushing 226 is used to secure the lead drive shaft 130 to the drive assembly housing 122. The lower radial bearing 228 is positioned around a smooth exterior wall 226c of the flange bushing 226 as shown. The lower radial bearing 228 is provided to withstand radial loads on the flange bushing 226 as it rotates during an operation of the tool 10. An example of a suitable lower radial bearing 228 is the Koyo Bearing No. BK1010 manufactured by JTEKT North America Corporation. The thrust bearing 224 is positioned around the intermediate portion 130*c* of the lead drive shaft 130 adjacent the flange bushing 226. The thrust bearing 224 is provided to withstand axial (or thrust) loads on the lead drive shaft 130, in the direction of arrow "A" seen in FIG. 9, as the lead drive shaft rotates during an operation of the tool 10. An example of a suitable thrust bearing 226 is the Koyo Bearing No. NTA613 manufactured by JTEKT North America Corporation. The thrust washer 222 is positioned on the thrust bearing 224 and is provided to hold the thrust bearing 224 in position within the drive assembly housing 122. In addition, the thrust washer 222 also resists and transfers thrust loads to the end cap 134. The upper radial bearing 220 is positioned around the intermediate portion 130*c* of the lead drive shaft 130 adjacent the thrust washer 222 as shown. The upper radial bearing 220 is provided to withstand radial loads on the lead drive shaft 130 as it rotates during an operation of the tool.

Referring to FIGS. 6 and 11, the jaw drive member 132 is movably coupled to the distal end portion 130*a* of the lead drive shaft 130. In the exemplary embodiment shown, the jaw drive member 132 includes a body 230 and a camming member 232. The body 230 includes a threaded center bore 234 that can be screwed onto the distal end portion 130*a* of the lead drive shaft 130. The camming member 232 has a cam surface 236 configured to engage a cam roller 238, seen in FIG. 4, between the first jaw plate 42 and the second jaw plate 44 of the second jaw assembly. When the motor 124 is activated by the control assembly 112, rotational movement of the lead drive shaft 130 is translated to linear motion of the jaw drive member 132 in the direction of the end cap 134 causing the cam surface 236 to contact the cam roller 238. As the cam roller 238 traverses the cam surface 236 the second law assembly is pivoted clockwise toward the first jaw assembly 20.

Figure 13:
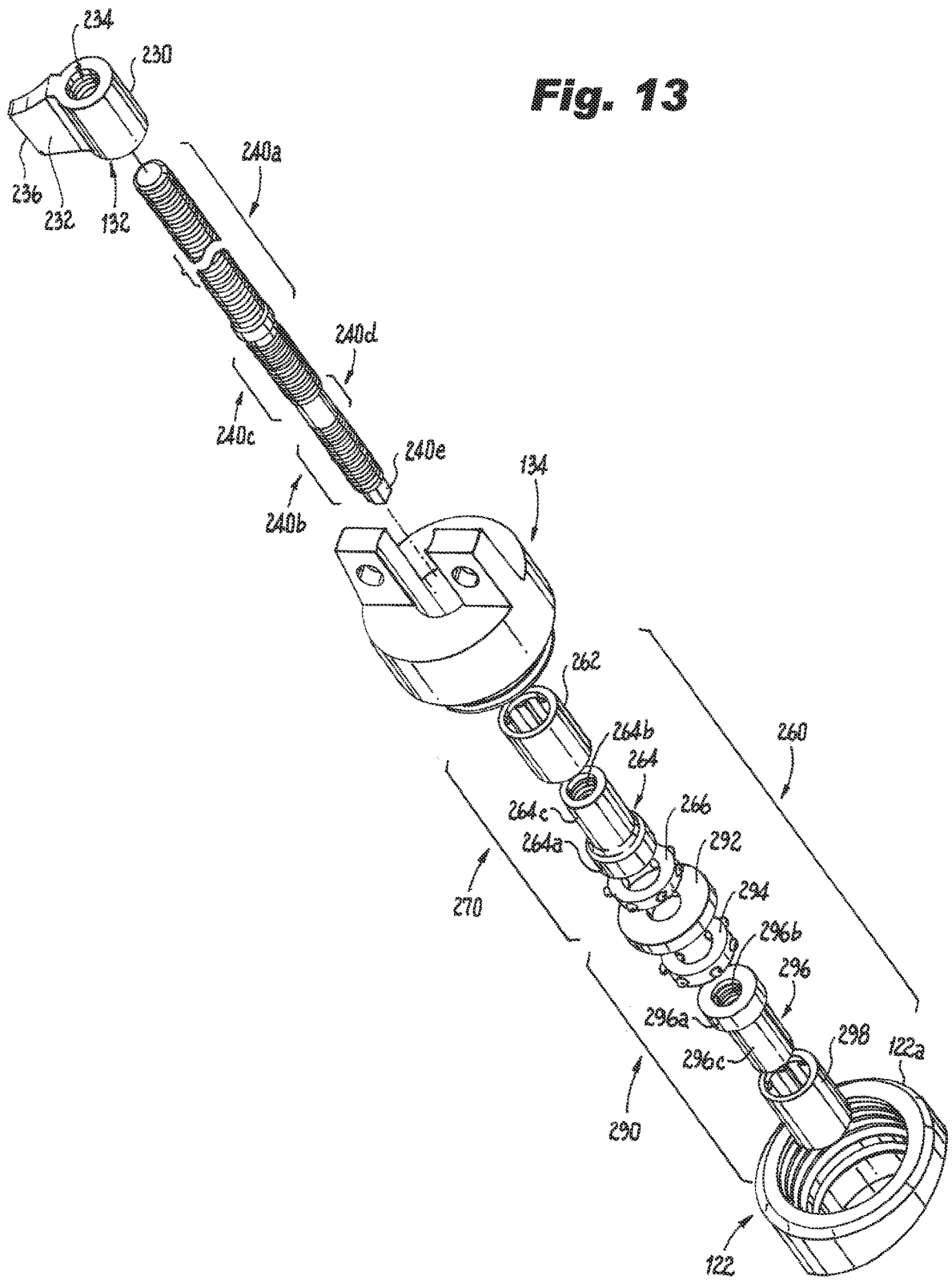
FIG. 13 is an exploded perspective view of another exemplary embodiment of a bearing assembly according to the present disclosure.
Figure 14:
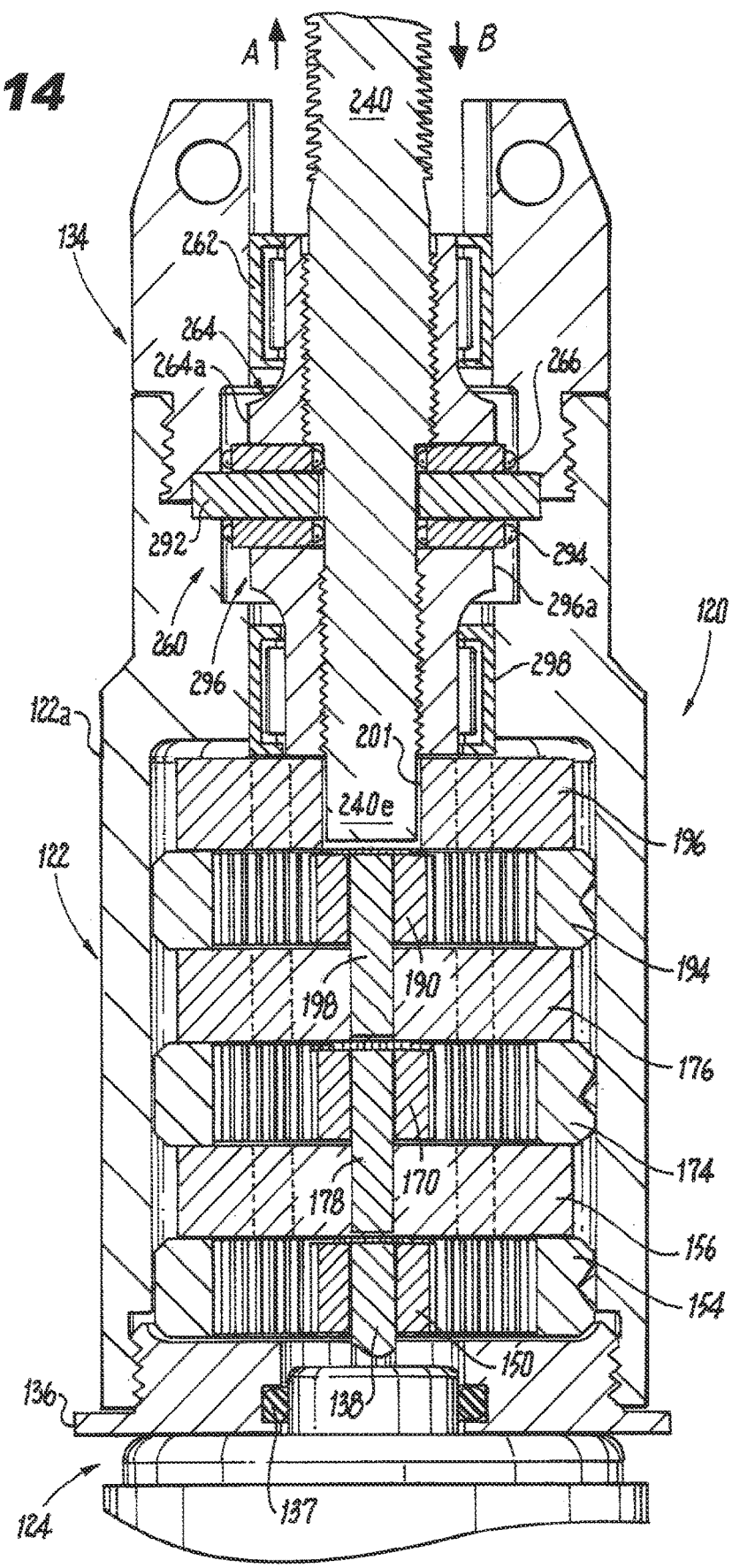
FIG. 14 is a cross-sectional view of a portion of the drive assembly housing similar to FIG. 9, illustrating the bearing system of FIG. 13 within the drive assembly housing.
Figure 15:
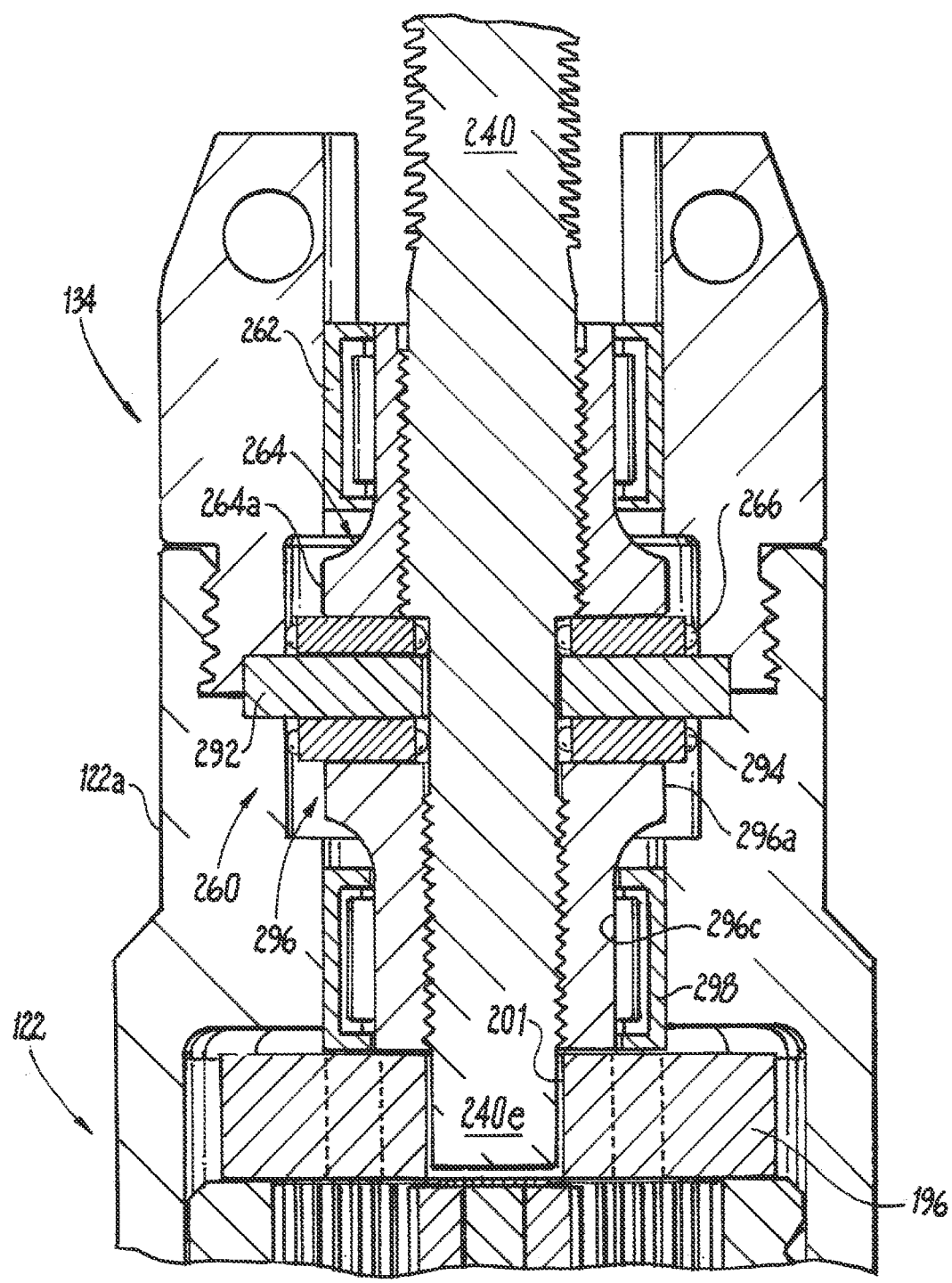
FIG. 15 is an enlarged cross-sectional view of the bearing system within the drive assembly housing of FIG. 14.

Referring now to FIGS. 13-15, another exemplary embodiment of a lead drive shaft 240 and a bearing system 260 according to the present disclosure is shown. In this exemplary embodiment, the lead drive shaft 240 includes a distal end portion 240*a*, a proximal end portion 240*b*, a first intermediate portion 240*c* and a second intermediate portion 240*d*. The first and second intermediate portions 240*c* and 240*d* are between the distal end portion 240*a* and the proximal end portion 240*b* of the lead drive shaft 240. In this exemplary embodiment, the distal end portion 240*a* is threaded with, for example, acme threads typically used for bi-directional loading on the lead drive shaft 240. The first intermediate portion 240*c* of the lead drive shaft 240 is adjacent the distal end portion 240*a* and has an outer diameter that is less than the outer diameter of the distal end portion 240*a*. The first intermediate portion 240*c* is threaded with, for example, conventional machine screw threads. The second intermediate portion 240*d* of the lead drive shaft 240 is adjacent the first intermediate portion 240*c* and has an outer diameter that is less than the outer diameter of the first intermediate portion 240*c*. The second intermediate portion 240*d* has a smooth exterior surface. The proximal end portion 240*b* of the lead drive shaft 240 is adjacent the second intermediate portion 240*d* and has an outer diameter that substantially the same as the outer diameter of the second intermediate portion 240*d*. The proximal end portion 240*b* is threaded with, for example, conventional machine screw threads. At the tip of the proximal end portion 240*b* of the lead drive shaft 240 is a spline or key 240*e*, seen in FIGS. 13 and 15, that interacts with the gear assembly 126 as described above. In the exemplary embodiment shown, the spline 240*e* is a hex shaped member that interacts with a hex shape keyway 201, seen in FIG. 8, in the gear assembly 126.

Continuing to refer to FIGS. 13-15, the bearing system 260 is provided so that the drive assembly 120 can withstand radial and axial (or thrust) loads as the lead drive shaft 240 is rotated during an operation of the tool 10. The bearing system 260 is positioned within a portion of the end cap 134 and the distal end portion 122*a* of the drive assembly housing 122 adjacent the gear assembly 126. In the exemplary embodiment shown, the bearing system 260 includes an upper bearing assembly 270 and a lower bearing assembly 290.

The upper bearing assembly 270 includes an upper radial bearing 262, a flange bushing 264 and a thrust bearing 266. The flange bushing 264 has a lower portion 264*a* with wider diameter that provides a platform to contact the thrust bearing 266. The flange bushing 264 has a center bore 264*b*, seen in FIG. 13, that is preferably threaded so that the flange bushing 264 can be threaded onto the first intermediate portion 240*c* of the lead drive shaft 240, as shown in FIG. 14. The flange bushing 264 is used to secure the lead drive shaft 240 to the drive assembly housing 122 and to hold the thrust bearing 266 in a fixed position relative to the lead drive shaft 240. The upper radial bearing 262 is positioned around a smooth exterior wall 264*c* of the flange bushing 264 as shown in FIG. 14. The upper radial bearing 262 is provided to withstand radial loads on the flange bushing 264 as the flange bushing rotates during an operation of the tool 10. An example of a suitable upper radial bearing 262 is the Koyo Bearing No. BK1010 manufactured by JTEKT North America Corporation. The upper thrust bearing 266 is positioned around the second intermediate portion 240*d* of the lead drive shaft 240 adjacent the lower portion 264*a* of the flange bushing 264. The upper thrust bearing 266 is provided to withstand axial (or thrust) loads in the direction of arrow "B" on the lead drive shaft 240 as it rotates during an operation of the tool 10. An example of a suitable thrust bearing 226 is the Koyo Bearing No. NTA613 manufactured by JTEKT North America Corporation.

The lower bearing assembly 290 includes a thrust washer 292, a lower thrust bearing 294, a lower flange bushing 296 and a lower radial bearing 298. The thrust washer 292 is positioned around the second intermediate portion 240*d* of the lead drive shaft 240 between the upper thrust bearing 266 and the lower thrust bearing 294. As shown in FIG. 15, the thrust washer 292 is captured between the drive assembly housing 122 and the end cap 134. This permits the thrust washer to resist and transfer thrust loads to either the drive assembly housing 122 or the end cap 134 depending on the direction of the load. The thrust washer 292 is also provided to help secure the lower thrust bearing 294 in position within the drive assembly housing 122. The thrust bearing 294 is positioned around the second intermediate portion 240*d* of the lead drive shaft 240 between the thrust washer 292 and the flange bushing 296. The thrust bearing 294 is provided to withstand axial (or thrust) loads on the lead drive shaft 240 in the direction of arrow "A" as lead drive shaft 240 rotates during an operation of the tool 10. An example of a suitable lower thrust bearing 294 is the Koyo Bearing No. NTA613 manufactured by JTEKT North America Corporation. The lower flange bushing 296 has an upper portion 296*a* with wider diameter that provides a platform on which the lower thrust bearing 294 can sit. The lower flange bushing 296 has a center bore 296*b*, seen in FIG. 13, that is preferably threaded so that the lower flange bushing 296 can be threaded onto the proximal end portion 240b of the lead drive shaft 240, as shown in FIG. 14. The lower flange bushing 296 is also used to secure the lead drive shaft 240 to the drive assembly housing 122. The lower radial bearing 298 is positioned around a smooth exterior wall 296c of the lower flange bushing 296 as shown. The lower radial bearing 298 is provided to withstand radial loads on the lower flange bushing 296 as it rotates during an operation of the tool 10. An example of a suitable lower radial bearing 298 is the Koyo Bearing No. BK1010 manufactured by JTEKT North America Corporation.

Figure 16:
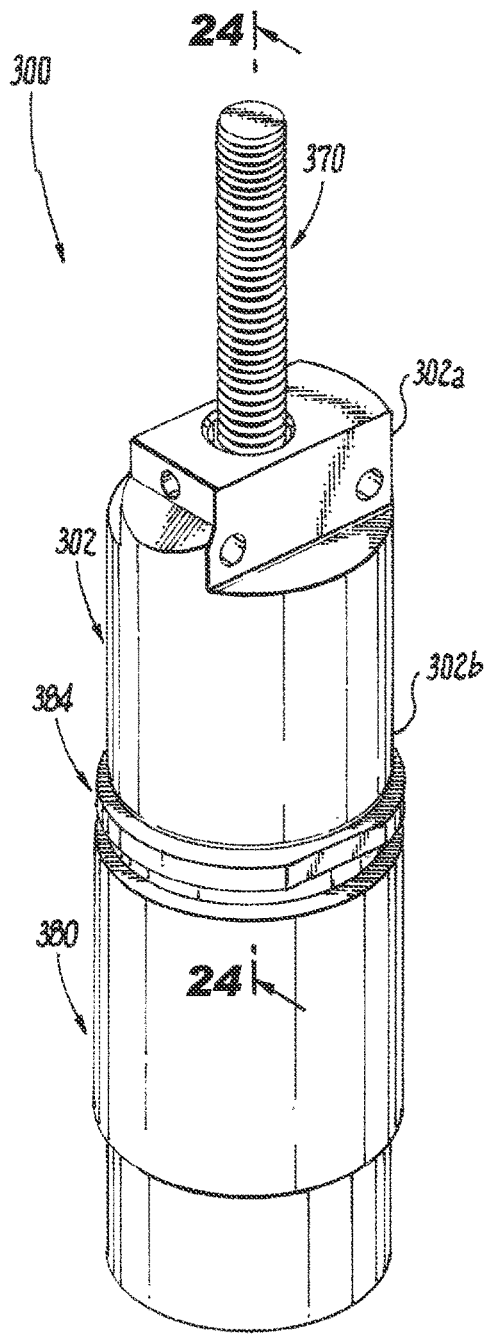
FIG. 16 is a perspective view of another exemplary embodiment of the drive assembly of FIG. 6.
Figure 17:
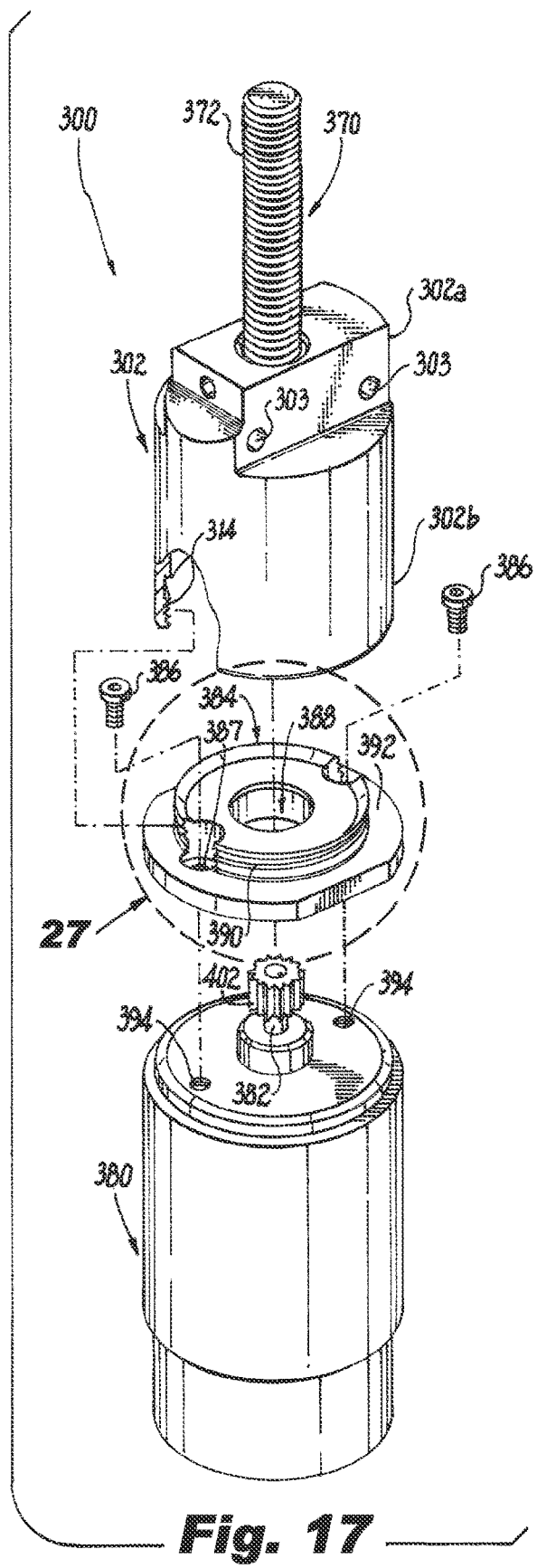
FIG. 17 is an exploded perspective view of the drive assembly of FIG. 16, illustrating a lead drive shaft extending from a drive assembly housing, and a drive housing adapter that is used to couple the drive assembly housing to a motor of the drive assembly.
Figure 18:
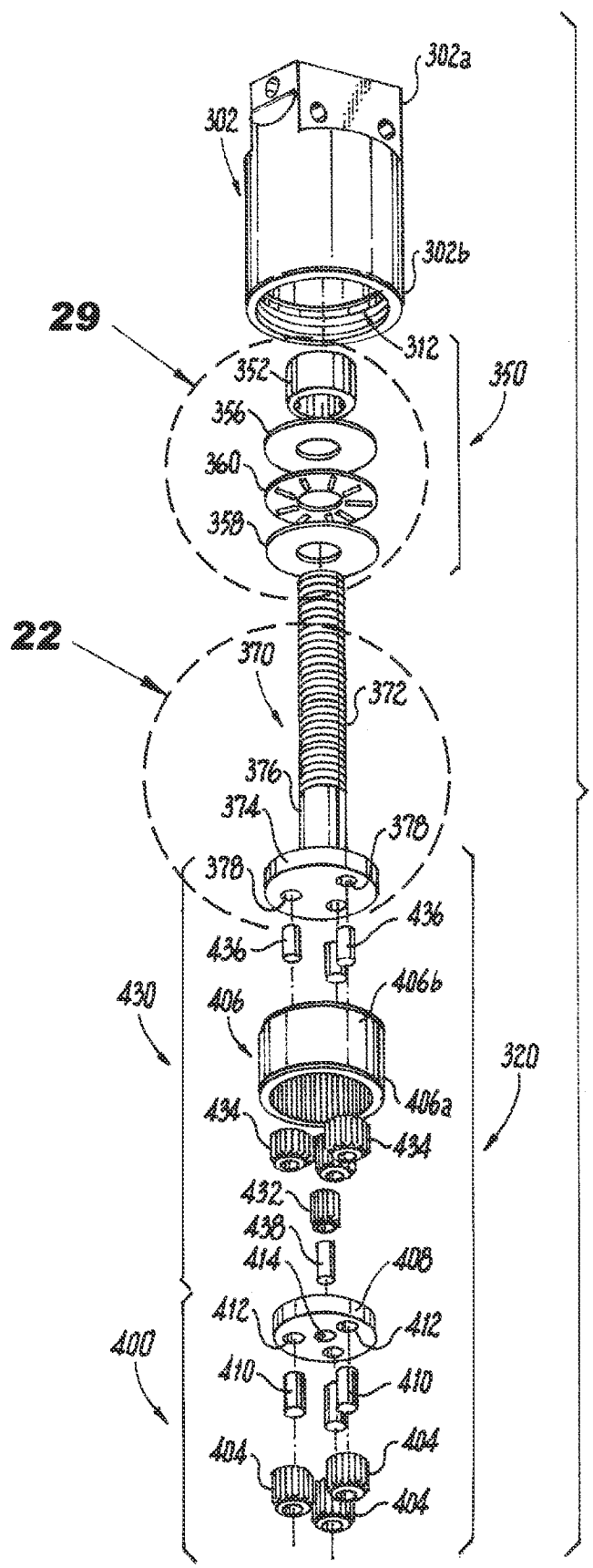
FIG. 18 is an exploded bottom perspective view of a portion of the drive assembly of FIG. 16, illustrating another exemplary embodiment of a gear assembly and bearing system of the drive assembly.
Figure 19:
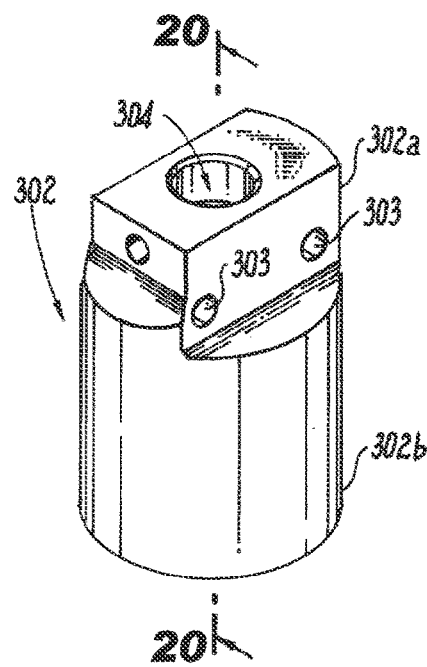
FIG. 19 is a perspective view of the drive assembly housing of FIG. 17.
Figure 20:
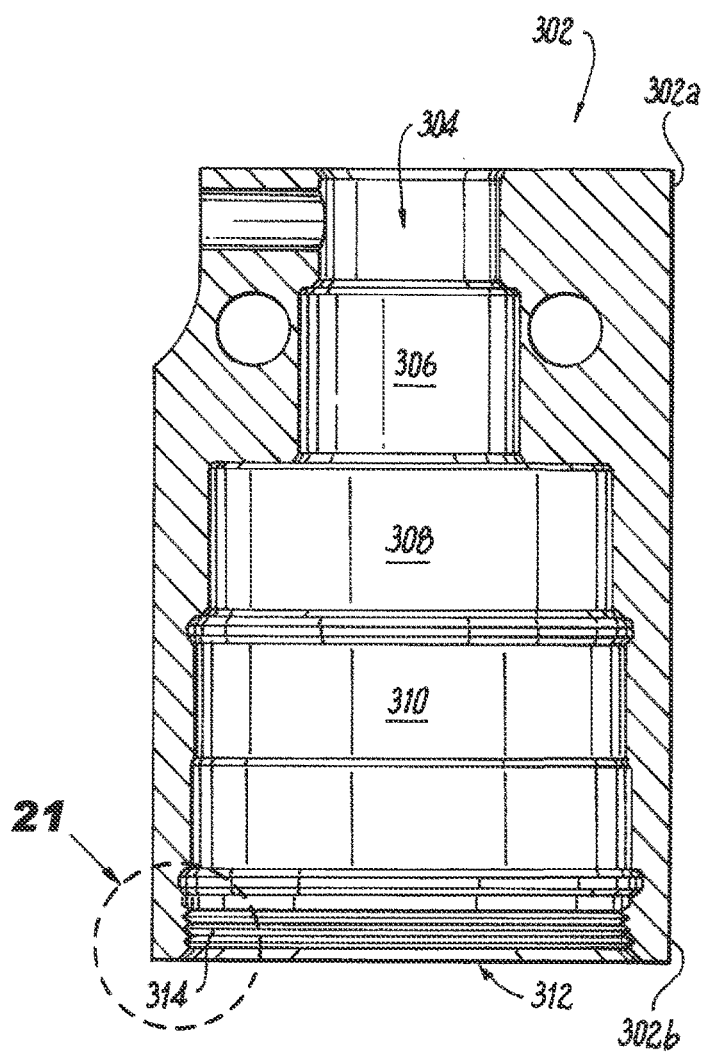
FIG. 20 is an enlarged cross-sectional view of the drive assembly housing of FIG. 19 taken from line 20-20.

Turning now to FIGS. 16-31, another exemplary embodiment of the drive assembly (or system) 300 according to the present disclosure is shown. As shown in FIGS. 16-18, the drive assembly 300 includes a drive assembly housing 302, a gear assembly 320, a bearing system 350, a lead drive shaft 370, a motor 380 and a jaw drive member that is similar to the jaw drive member 132 shown in FIG. 6 and described above. The drive assembly housing 302 holds or encases the gear assembly 320, the bearing system 350 and at least a portion of the lead drive shaft 370. More specifically, as shown in FIGS. 19-23, the drive assembly housing 302 includes a shaft opening 304, a radial bearing compartment 306, a thrust bearing compartment 308, a gear compartment 310 ending with an opening 312 at a proximal end portion 302b of the drive assembly housing 302. It is noted that the wall of the gear compartment 310 may be a flat wall or a stepped wall that aids in securing a ring gear of the gear assembly within the gear compartment 310. Within drive assembly housing 302, the lead drive shaft 370 is operatively coupled to the gear assembly 320, seen in FIG. 18. Preferably, a distal end portion 372 of the lead drive shaft 370 extends from a distal end portion 302a of the drive assembly housing 302, seen in FIGS. 16 and 17. The distal end portion 302a of the drive assembly housing 302 also includes a pair of mounting apertures 303. The mounting apertures 303 are positioned to align with corresponding mounting apertures 84 and 86 in the first and second jaw plates 22 and 24 of the first jaw assembly 20, seen in FIG. 2. The first and second jaw plates can then be secured to the distal end portion 302a of the drive assembly housing 302 using, for example bolts, similar to the bolts 143 shown in FIG. 5.

Figure 24:
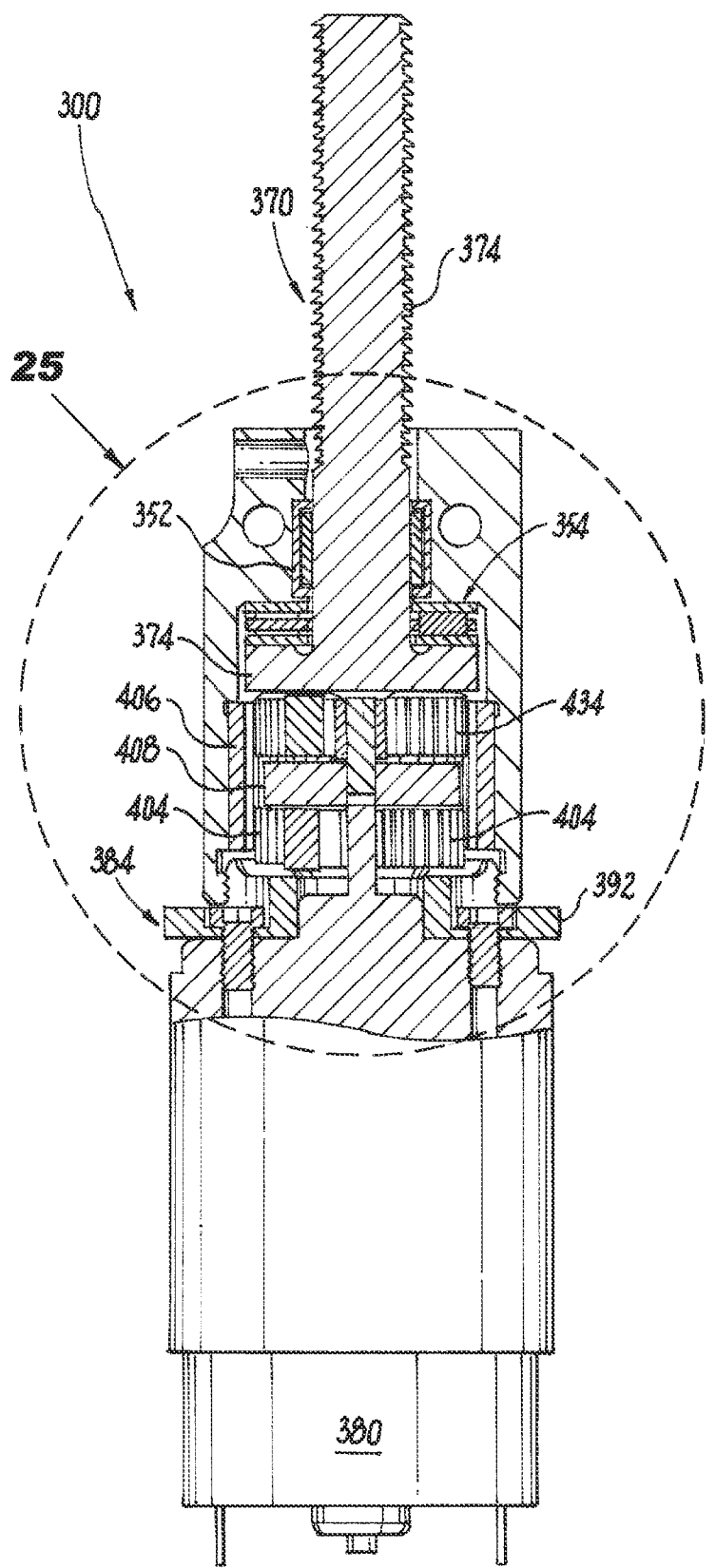
FIG. 24 is a side elevation view in partial cross-section of the drive assembly of FIG. 16, illustrating the lead drive shaft, bearing system and gear system of the drive assembly installed within the drive assembly housing.
Figure 25:
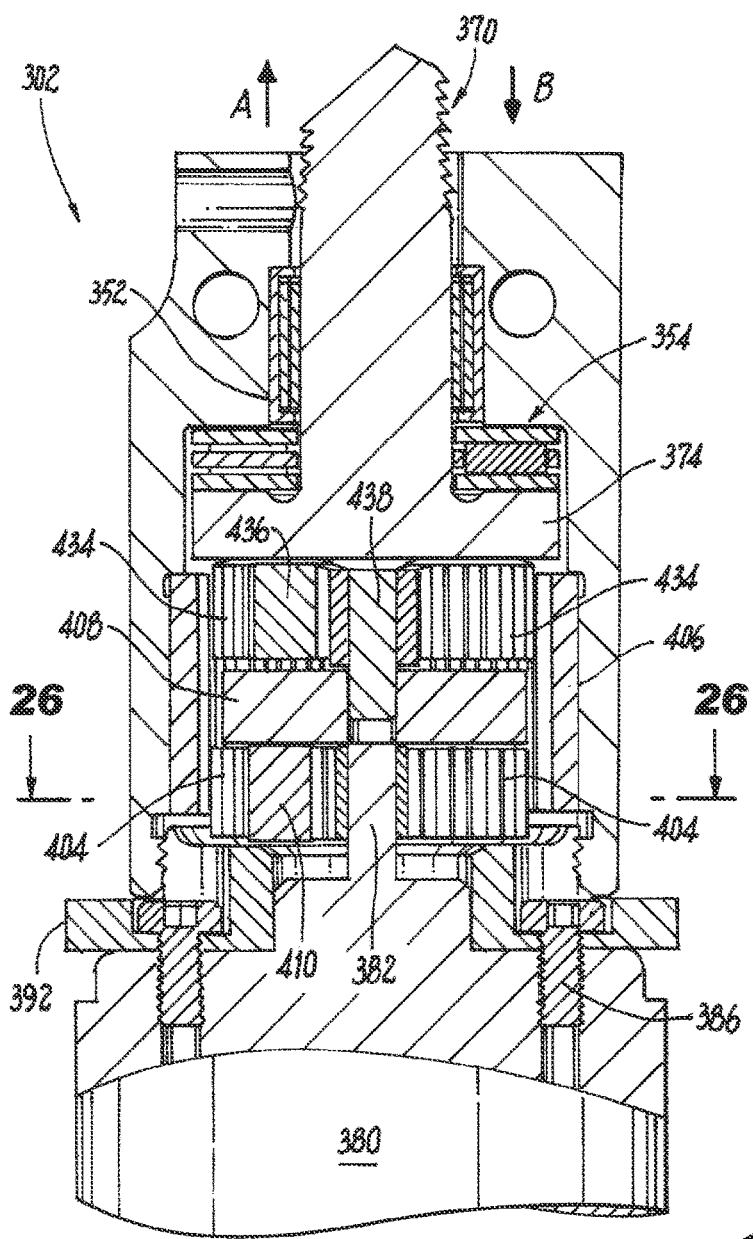
FIG. 25 is an enlarged view of the cross-sectional portion of the drive assembly of FIG. 24 taken from detail 25, illustrating the lead drive shaft, bearing system and gear assembly of the drive assembly installed within the drive assembly housing.

In this exemplary embodiment, the lead drive shaft 370 includes the distal end portion 372, a proximal end portion 374 and an intermediate portion 376 between the distal end portion 372 and the proximal end portion 374, as shown in FIGS. 24 and 25. The distal end portion 372 is threaded with, for example, buttress threads typically used for one-directional loading on the lead drive shaft 370, or acme threads typically used for bi-directional loading on the lead drive shaft 370. The proximal end portion 374 of the lead drive shaft 370 is a substantially flat plate with, for example, one or more shaft apertures 378 used to couple the lead drive shaft 370 to the gear assembly 320. In the exemplary embodiment shown, the proximal end portion 374 of the lead drive shaft 370 is a substantially round flat plate, as shown in FIG. 18. The intermediate portion 376 of the lead drive shaft 370 has a smooth exterior surface with an outside diameter that is substantially the same as the outside diameter of the distal end portion 372. The jaw drive member 132, seen in FIG. 6, is movably coupled to the distal end portion 372 of the lead drive shaft 370.

Figure 21:
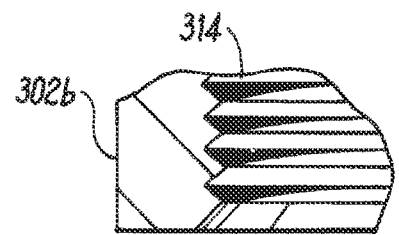
FIG. 21 is an enlarged view of a portion of the drive assembly housing of FIG. 20 taken from detail 21.
Figure 26:
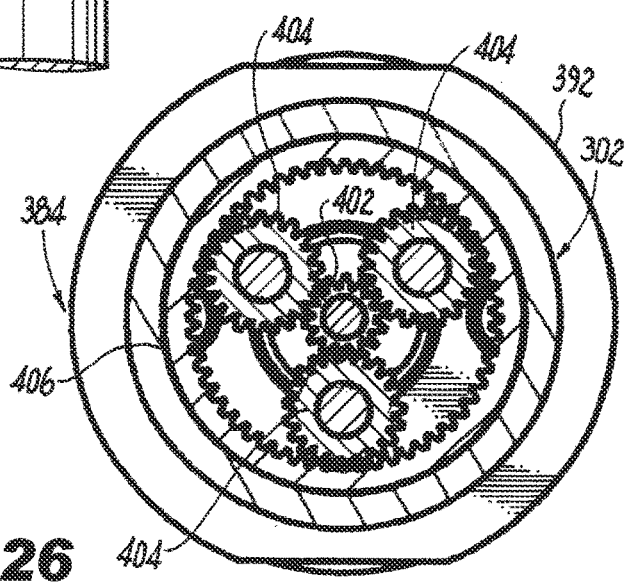
FIG. 26 is a cross-sectional view of the drive assembly of FIG. 25 taken from line 26-26 and illustrating the gear assembly shown as a planetary gear assembly.
Figure 27:
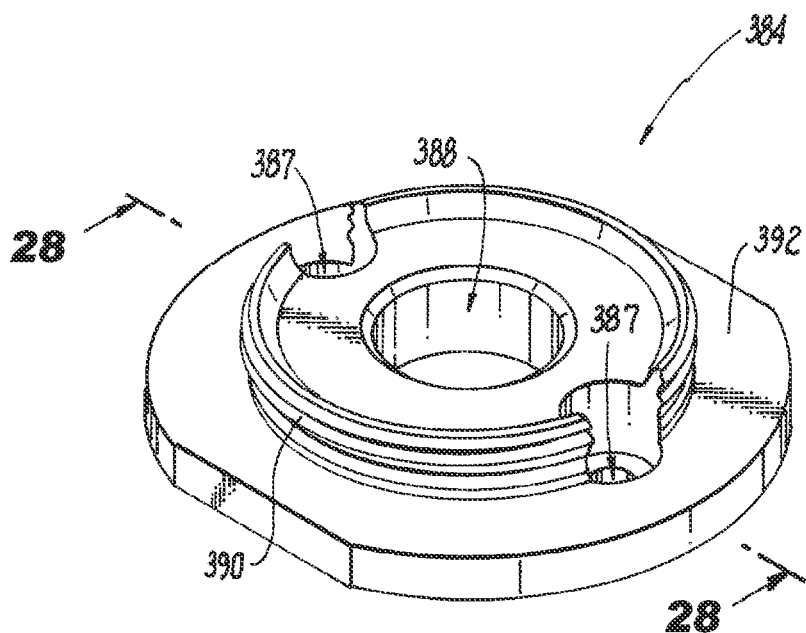
FIG. 27 is an enlarged perspective view of the drive housing adapter of FIG. 17.
Figure 28:
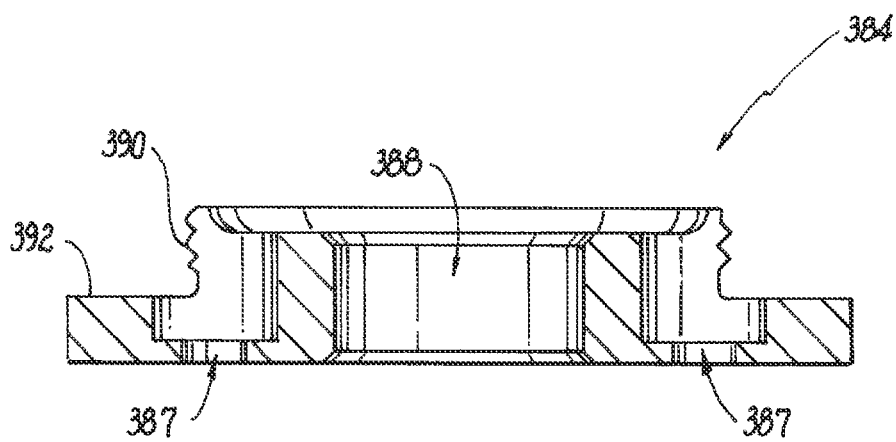
FIG. 28 is a cross-sectional view of the drive housing adapter of FIG. 27 taken from line 28-28.
Figure 29:
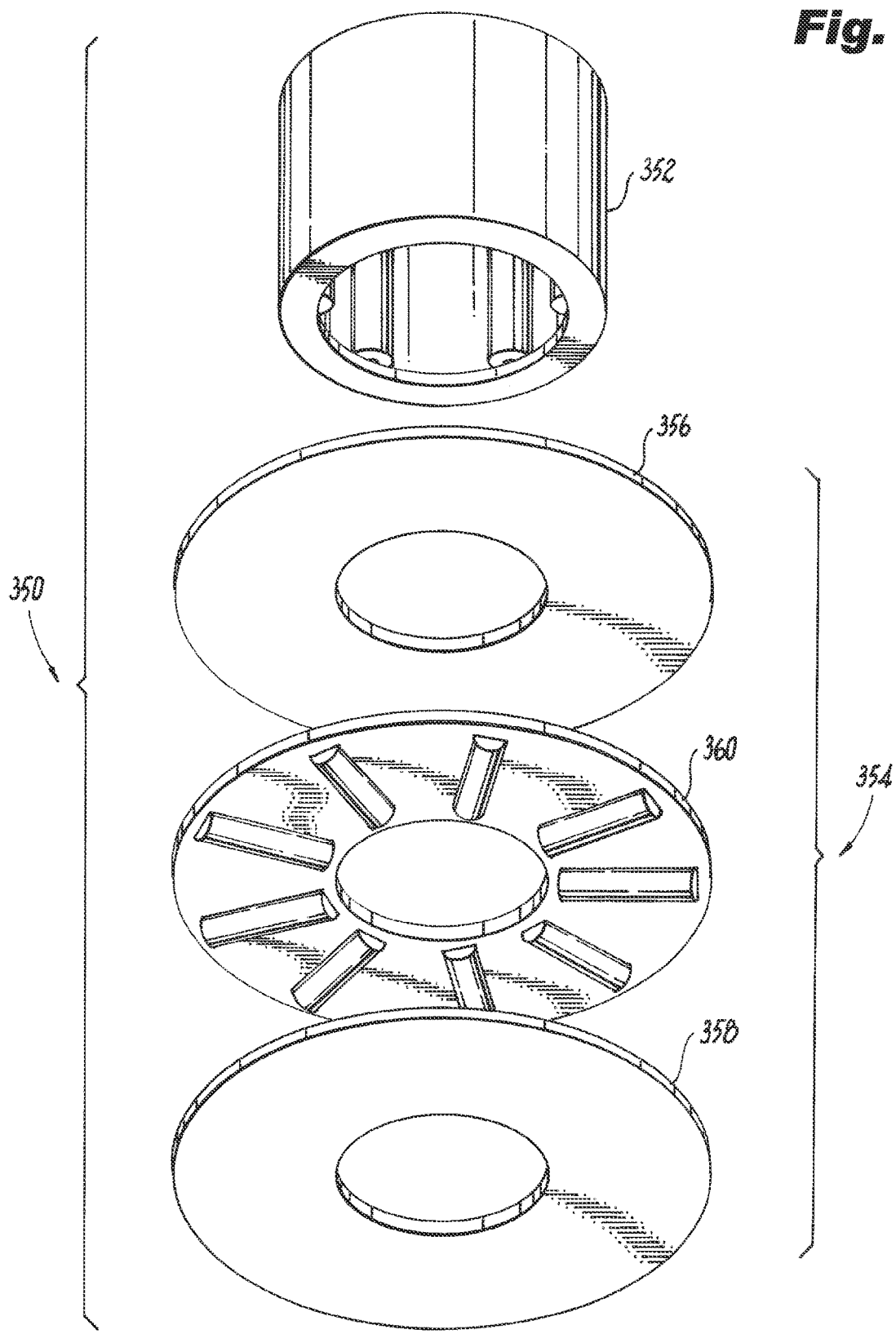
FIG. 29 is an enlarged, exploded perspective view of the bearing system of FIG. 18, illustrating a thrust bearing and a radial bearing.

Turning now to FIGS. 17, 18 and 26-28, another exemplary embodiment of a gear assembly according to the present disclosure will be described. The gear assembly 320 is positioned with the gear compartment 310 of the drive assembly housing 302. In this exemplary embodiment, the gear assembly 320 is a multi-stage gear assembly that utilizes a common ring gear. Each stage in the gear assembly is a planetary gear assembly that includes a pinion gear, two or more planetary gears, the common ring gear and a carrier plate. As an example, in the exemplary embodiment shown there are two planetary gear assemblies. A first planetary gear assembly 400 is the first stage (or an input stage), and a second planetary gear assembly 430 is the second stage (or an output stage). As shown in FIGS. 17 and 18, the first planetary gear assembly 400 includes a pinion gear 402, three planetary gears 404, the common ring gear 406, a carrier plate 408 and gear shafts 410. The pinion gear 402 is attached to the drive shaft 382 of the motor 380. The planetary gears 404 are attached to gear shafts 410 inserted into mounting holes 412 of the carrier plate 408 and extending from one side of the carrier plate 408 so that the planetary gears 404 are rotatable relative to their corresponding gear shaft 410. The gear shafts 410 are arranged on the carrier plate 408 so that the planetary gears 404 are spaced apart and independent of each other. As shown in FIGS. 26-28, the carrier plate 408 is positioned within the bottom portion 406a of the ring gear 406 so that the teeth of the planetary gears 404 intermesh with the teeth of the ring gear 406. It is noted that the outer diameter of the carrier plate 408 is less than the inner diameter of the ring gear 406 so that the carrier plate 408 does not damage the teeth on the ring gear 406, as seen in FIGS. 26 and 27, as the carrier plate 408 rotates within the ring gear. The pinion gear 402 passes through a drive housing adapter 384, seen in FIGS. 17, 29 and 30, releasably secured to the drive housing 302 so that the pinion gear 402 is positioned within the bottom portion 406a of the ring gear 406 between the planetary gears 404 so that the teeth of the pinion gear 402 intermesh with the teeth of the planetary gears 404, as seen in FIGS. 26-28. More specifically, the drive housing adapter 384 of the drive assembly housing 302 is releasably secured to the motor 380 using fasteners 386, e.g., cap screws, passing through mounting apertures 387 in a lip portion 392 of the drive housing adapter 384 into engagement with mounting apertures 394 in the motor 380, seen in FIGS. 17, 26 and 27. The pinion gear 402 passes through aperture 388 in the drive housing adapter 384 so that the pinion gear 402 can intermesh with the teeth of the planetary gears 404, as seen in FIGS. 21 and 22.

Continuing to refer to FIGS. 18 and 26-28, the second planetary gear assembly 430 includes a pinion gear 432, three planetary gears 434, the common ring gear 406, a carrier plate which, in this exemplary embodiment, is the proximal end portion 374 of the lead drive shaft 370, and gear shafts 436. The pinion gear 432 is attached to a gear shaft 438 inserted into mounting hole 414 in the carrier plate 408 and extending from a side of the carrier plate 408 that is opposite the planetary gears 404. The planetary gears 434 are attached to gear shafts 436 inserted into mounting holes 378 in the proximal end portion 374 of the lead drive shaft 370 and extending from one side of the proximal end portion 374 of the lead drive shaft 370 so that the planetary gears 434 are rotatable relative to their corresponding gear shaft 436. The gear shafts 436 are arranged on the proximal end portion 374 of the lead drive shaft 370 so that the planetary gears 434 are spaced apart and independent of each other. The proximal end portion 374 of the lead drive shaft 370 is positioned adjacent a top portion 406b of the ring gear 406 so that the teeth of the planetary gears 344 are within the drive assembly housing 302 and intermesh with the teeth of the top portion 406b of the ring gear 406, as seen in FIGS.

26 and 27. The pinion gear 432 is positioned within the ring gear 406 between the planetary gears 434 so that the teeth of the pinion gear 432 intermesh with the teeth of the planetary gears 434, as seen in FIGS. 18, 26 and 27.

As noted, the proximal end portion 374 of the lead drive shaft 370 is secured within the drive assembly housing 302 by the bearing system 350, the gear assembly 320 and the drive housing adapter 384 of the drive assembly housing 302, seen in FIGS. 26 and 27. The drive housing adapter 384 is secured to a proximal end portion 302b of the drive assembly housing 302 by a mechanical connection. In the exemplary embodiment shown, the mechanical connection is a threaded connection, where threading 390 on the drive housing adapter 384 is screwed into threading 314 in the drive assembly housing 302, seen in FIGS. 17, 20 and 23. However, other mechanical connections are contemplated, including snap-fit and press-fit connections where the drive housing adapter 384 is snapped or pressed within the drive assembly housing 302. Set screw connections where set screws secures the drive housing adapter 384 to the drive assembly housing 302 and welds are also contemplated. A first sealing member similar to the sealing member 137 shown in FIG. 14, may be positioned within the aperture 388 in the drive housing adapter 384 to seal the connection between motor 380 and the drive housing adapter 384. A non-limiting example of a suitable first sealing member is an O-ring. Similarly, a second sealing member (not shown) may be positioned on the lip portion 392 adjacent the threading 390 of the drive housing adapter 384 to further seal the connection between motor 380 and the drive housing adapter 384. A non-limiting example of a suitable second sealing member is an O-ring.

Referring now to FIGS. 18, 26, 27 and 31, another exemplary embodiment of a bearing system according to the present disclosure is shown. The bearing system 350 is provided so that the drive assembly 300 can withstand radial and axial (or thrust) loads as the lead drive shaft 370 is rotated during an operation of the tool 10. The bearing system 350 is positioned on the intermediate portion 376 of the lead drive shaft 370 with a portion within the bearing compartment 306 of the drive assembly housing 302 and a portion in the thrust bearing compartment 308 of the drive assembly housing.

In the exemplary embodiment shown, the bearing system 350 includes a radial bearing 352 and a thrust bearing assembly 354. The radial bearing 352 is provided to withstand radial loads on the lead drive shaft 370 as it rotates during an operation of the tool 10. An example of a suitable radial bearing 352 is the Koyo Bearing No. BK1010 manufactured by JTEKT North America Corporation. The thrust bearing assembly 354 includes an upper thrust washer 356, a lower thrust washer 358 and a thrust bearing 360 between the upper thrust washer 356 and lower thrust washer 358. The thrust bearing assembly 354 is provided to withstand axial (or thrust) loads on the lead drive shaft 370, in the direction of arrow "A" seen in FIG. 25, as the lead drive shaft rotates during an operation of the tool 10. An example of a suitable thrust bearing assembly 354 is the Koyo Bearing No. NTA613 manufactured by JTEKT North America Corporation. The upper thrust washer 356 is positioned on the thrust bearing 360 and the lower thrust washer 358 is positioned on the thrust bearing 360 and are provided to hold the thrust bearing 360 in position within the thrust bearing compartment 308 of the drive assembly housing 302. In addition, the upper thrust washer 356 and the lower thrust washer 358 also resists and transfers thrust loads to the distal end 302a of the drive assembly housing 302.

The radial bearing 352 has a central bore 353 with a diameter sufficient to receive the intermediate portion 376 of the lead drive shaft 360. The thrust bearing assembly 354 has a center bore 362, seen in FIG. 31, with a diameter sufficient to receive the intermediate portion 376 of the lead drive shaft 360. More specifically, the radial bearing 352 is press fit into the radial bearing compartment 306 of the drive assembly housing 302 so that the radial bearing 352 can receive the intermediate portion 376 of the lead drive shaft 370, as seen in FIGS. 26 and 27. The thrust bearing 354 rests on the proximal end portion 374 of the lead drive shaft 370 within the thrust bearing compartment 308 of the drive assembly housing 302, as seen in FIGS. 26 and 27.

It is noted that an additional structure or an additional radial bearing (not shown) may be used to address radial loading or leaning at the distal end portion 372 of the lead drive shaft 370, especially under a full load of the jaw drive member 132 movably attached to the lead drive shaft 370. For example, such additional structure may be the stabilizing roller 239, seen in FIG. 4, that engages the surface 233 of the jaw drive member 132 described above. The stabilizing roller 239 opposes the force applied by the cam roller 238 to the jaw drive member 132 to provide additional stability to the distal end portion 372 of the lead drive shaft 370 as the second jaw assembly 40 moves toward the first jaw assembly 20 when crimping a wire termination positioned between the first and second jaw assemblies during an operation of the tool 10.

Figure 30:
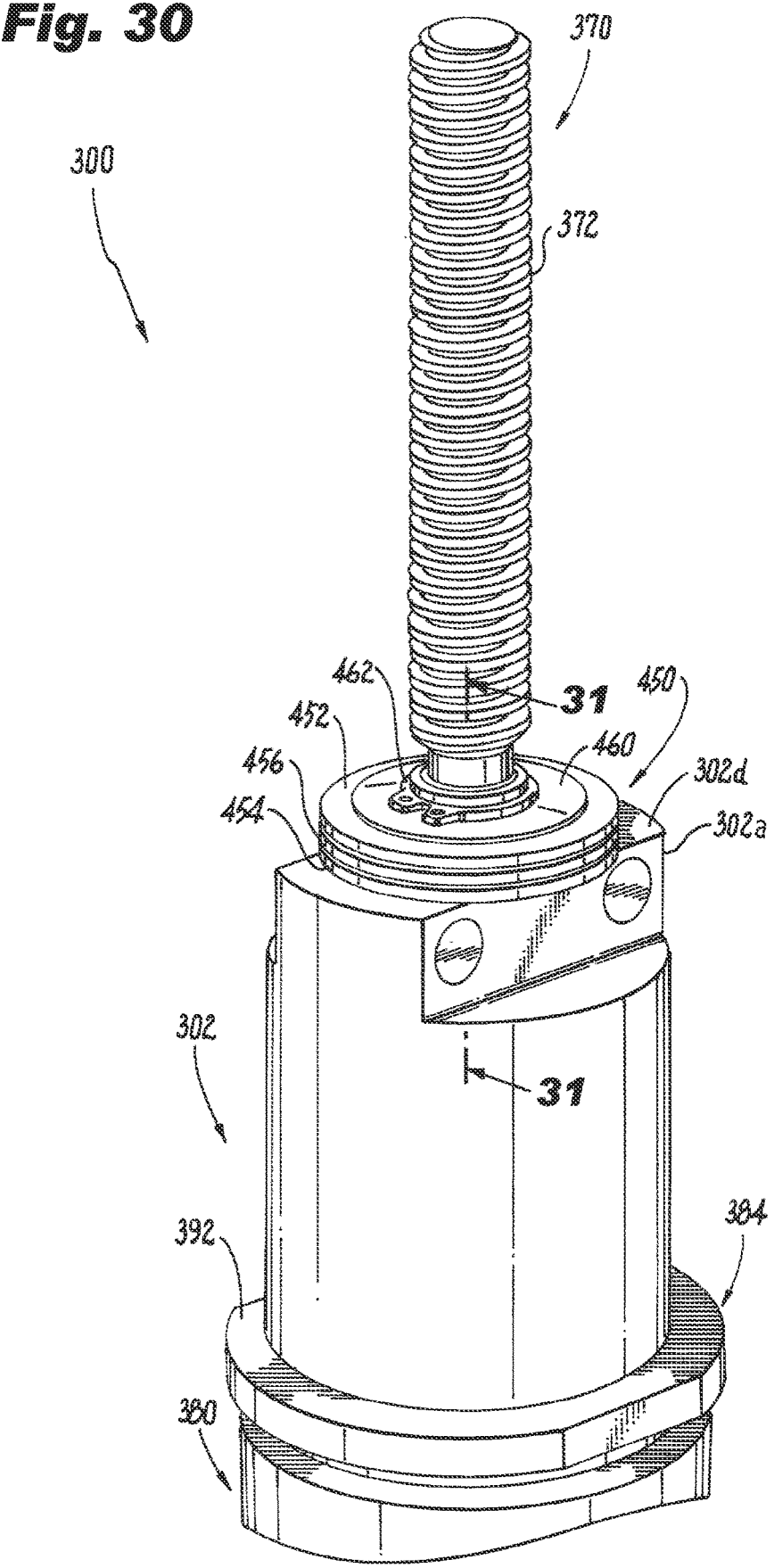
FIG. 30 is a perspective view of another exemplary embodiment of a drive assembly according to the present disclosure, illustrating a thrust bearing assembly on an outer surface of the drive assembly housing.
Figure 31:
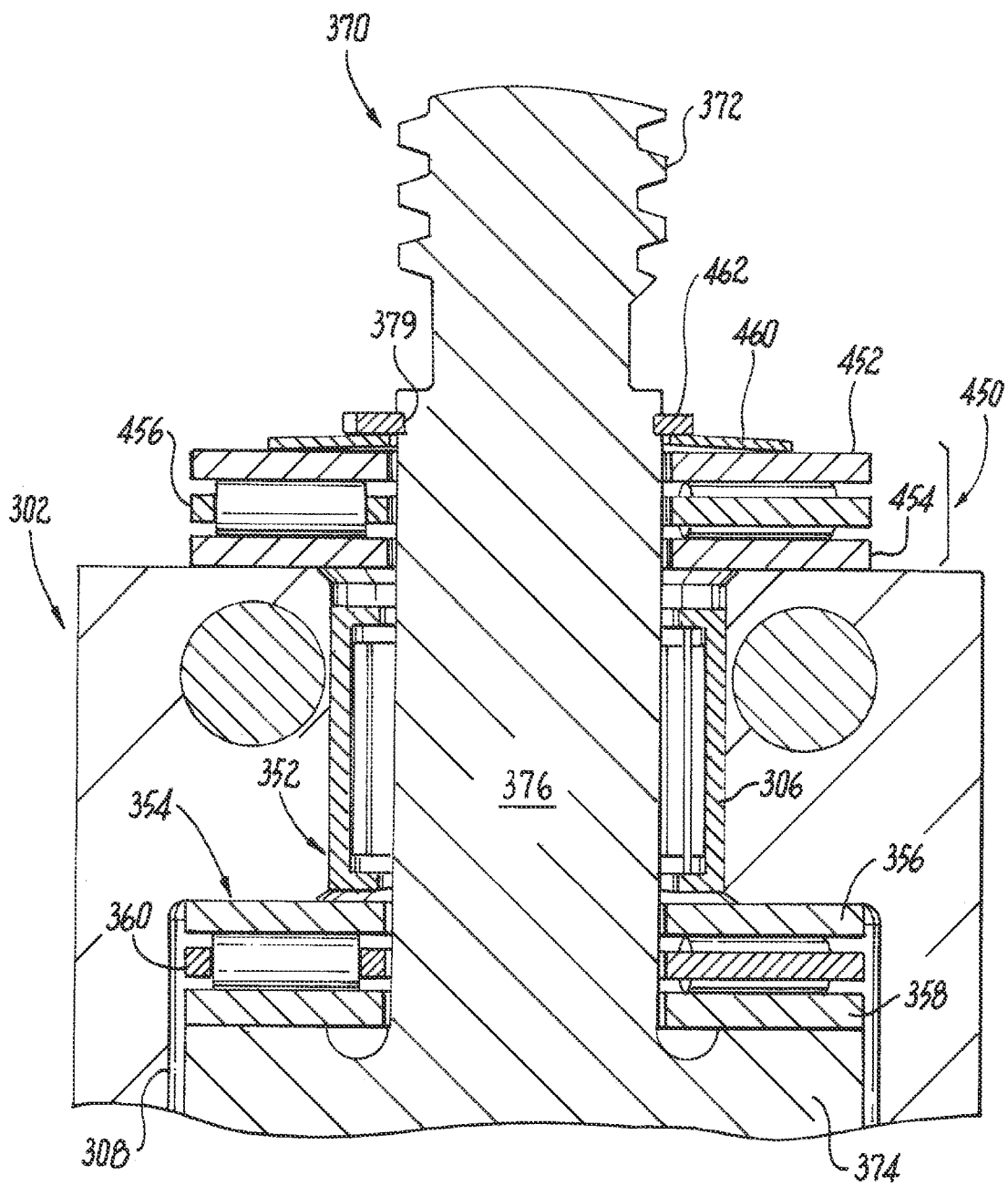
FIG. 31 is an enlarged cross-sectional view of the drive assembly of FIG. 30, illustrating the lead drive shaft, bearing system and gear assembly of the drive assembly installed within the drive assembly housing, and the thrust bearing assembly on an outer surface of the drive assembly housing.

Referring to FIGS. 30 and 31, the bearing system 350 may include a second thrust bearing assembly 450. The second or upper thrust bearing assembly 450 includes an upper thrust washer 452, a lower thrust washer 454 and a thrust bearing 456 between the upper thrust washer 452 and lower thrust washer 454. The thrust bearing assembly 450 is provided to withstand axial (or thrust) loads on the lead drive shaft 370, in the direction of arrow "B" seen in FIG. 25, as the lead drive shaft rotates during an operation of the tool 10. An example of a suitable second thrust bearing assembly 450 is the Koyo Bearing No. NTA613 manufactured by JTEKT North America Corporation. In this exemplary embodiment, the upper thrust washer 452 is positioned on the thrust bearing 456 and the lower thrust washer 454 is positioned on the outer surface 302d of the distal end portion 302a of the drive assembly housing 302. The second thrust bearing 450 has a central opening 458 configured to receive the intermediate portion 376 of the lead drive shaft 370 that extends out of the distal end portion 302a of the drive assembly housing 302. The second thrust bearing 450 is secured in position on the outer surface 302d of the of the distal end portion 302a of the drive assembly housing 302 using a spring washer 460 and a retaining ring 462 that attaches to a notch 379 in the intermediate portion 376 of the lead drive shaft 370, as shown.

Referring again to FIGS. 17, 26 and 27 and as described above, extending from a proximal end portion 302b of the drive assembly housing 302 and operatively coupled to the gear assembly 320 is the motor 380. Generally, the motor 380 rotates a motor drive shaft 382, seen in FIG. 17, that is coupled to the gear assembly 320. The gear assembly 320 reduces the rate of rotation of the motor drive shaft 382. The lead drive shaft 370 is coupled to the gear assembly 320 and rotates at the output rate of the gear assembly. The bearing system 350 is provided so that the lead drive shaft 370 can withstand radial and axial loads generated during an operation of the jaw assemblies 20 and 40. As an example, the motor 380 may be configured to rotate the motor drive shaft 382 at a rate in the range of about 15,000 rpm and about 21,000 rpm with an output torque in the range of about 0.4 in-lb. and about 0.8 in-lb. In this configuration, the motor current may be in the range of about 6 amps and about 15 amps, the battery voltage may be in the range of about 16 VDC and about 24 VDC, and the output motor power may be in the range of about 95 watts and about 160 watts. The gear assembly 320 may reduce the rate of rotation of the motor drive shaft 382 to a range of about 375 rpm and about 1400 rpm. As such, the gear ratio of the gear assembly 320 may be in the range of about 15:1 and about 40:1. The output of the gear assembly 320 is transferred to the lead drive shaft 370. In this exemplary embodiment, the lead drive shaft 370 is a threaded shaft having a diameter in a range of about 0.35 inches and about 0.50 inches, with a lead, e.g., a screw lead, in a range of about 0.071 inches and about 0.125 inches. Under the motor operating configuration described herein above, the efficiency of the gear assembly 320 may be in the range of about 11% and about 61%, and the pull force of the lead drive shaft 370 may be in the range of about 200 lbs. and about 400 lbs. Movement of the lead drive shaft 370 is transferred to the jaw drive member 132, seen in FIG. 6, which as noted above is attached to the lead drive shaft 370. In this exemplary embodiment of the present disclosure, the output of the gear assembly 320 is rotational motion which is transferred to the lead drive shaft 370. Rotation of the lead drive shaft 370 is translated to linear movement of the jaw drive member 132. With a pull force of the lead drive shaft 370 in the exemplary range of about 200 lbs. and about 400 lbs., the linear travel distance of the jaw drive member 132 may be in the range of about 0.6 inches and about 0.9 inches. Linear movement of the jaw drive member 132 moves the second jaw assembly 40 toward the first jaw assembly 20 when crimping a wire termination positioned between the first and second jaw assemblies. It is noted that with the gear assembly 320 reducing the rate of rotation of the motor drive shaft 382 to a range of about 375 rpm and about 1400 rpm, the total crimp cycle of the tool 10 may be in the range of about 0.4 seconds and about 2.0 seconds.

As another example, the motor 380 may be configured to rotate the motor drive shaft 382 at a rate in the range of about 19,000 rpm and about 21,000 rpm with an output torque in the range of about 0.49 in-lb. and about 0.69 in-lb. In this exemplary embodiment, the motor current may be in the range of about 9 amps and about 12 amps, the battery voltage may be in the range of about 16 VDC and about 22 VDC, and the output motor power may be in the range of about 120 watts and about 160 watts. The gear assembly 320 may reduce the rate of rotation of the motor drive shaft 382 to a range of about 600 rpm and about 1200 rpm. As such, the gear ratio of the gear assembly 320 may be in the range of about 18:1 and about 33:1. As noted, the output of the gear assembly 320 is transferred to the lead drive shaft 370. In this exemplary embodiment, the lead drive shaft 370 is a threaded shaft having a diameter in a range of about 0.35 inches and about 0.4 inches, with a lead, e.g., a screw lead, in a range of about 0.075 inches and about 0.1 inches. Under the motor operating configuration described above the efficiency of the gear assembly 320 may be in the range of about 20% and about 52%, and the pull force of the lead drive shaft 370 may be in the range of about 288 lbs. and about 377 lbs. Movement of the lead drive shaft 370 is transferred to the jaw drive member 132. In this exemplary embodiment of the present disclosure, the output of the gear assembly 320 is rotational motion which is transferred to the lead drive shaft 370. Rotation of the lead drive shaft 370 is translated to linear movement of the jaw drive member 132. With a pull force of the lead drive shaft 370 in the exemplary range of about 288 lbs. and about 377 lbs., the linear travel distance of the jaw drive member 132 may be in the range of about 0.65 inches and about 0.85 inches. Linear movement of the jaw drive member 132 moves the second jaw assembly 40 toward the first jaw assembly 20 when crimping a wire termination positioned between the first and second jaw assemblies. It is noted that with the gear assembly 320 reducing the rate of rotation of the motor drive shaft 382 to a range of about 600 rpm and about 1200 rpm, the total crimp cycle of the tool 10 may be in the range of about 0.4 seconds and about 0.9 seconds.

As described above, in the exemplary embodiment shown, the motor 380 is electrically connected to the battery 108 and the switch 116, seen in FIG. 2, and its operation is controlled by the trigger 114. Generally, the motor 380 is adapted to operate at a nominal voltage corresponding to the voltage of the battery 108, e.g., between about 16 VDC and about 24 VDC. For example, if the battery 108 is adapted to output a voltage of about 20 VDC, then the motor 108 would be adapted to operate at a voltage of about 20 VDC. Under a no-load condition, such a motor 108 can operate at about 22,000 rpm with a current of about 0.2 amps. At maximum efficiency, the motor 108 can operate in a range of about 18,000 rpm to about 20,000 rpm with a current in a range of about 10 amps and about 12 amps, a torque of about 0.4 in-lb., and an output wattage in a range of about 95 W and about 135 W.

The foregoing embodiments and advantages are merely exemplary and are not to be construed as limiting the scope of the present invention. The description of an exemplary embodiment of the present invention is intended to be illustrative, and not to limit the scope of the present invention. Various modification, alternatives and variations will be apparent to those of ordinary skill in the art and are intended to fall within the scope of the invention.

What is claimed is:

1. A drive assembly for a portable, hand-held tool, the drive assembly comprising:
a drive assembly housing;
a gear assembly positioned within the drive assembly housing, the gear assembly including a multi-stage planetary gear assembly having at least an input stage and an output stage;
a lead drive shaft having a distal end portion, a proximal end portion and an intermediate portion between the distal end portion and the proximal end portion, the proximal end portion is positioned within the drive assembly housing and interacts with the output stage of the gear assembly, the distal end portion being threaded and substantially outside the drive assembly housing, and the intermediate portion is positioned within the drive assembly housing and has a smooth exterior surface; and
a bearing system having a portion within the drive assembly housing and a portion external to the drive assembly housing, the bearing system being interactive with at least the intermediate portion of the lead drive shaft enabling the lead drive shaft to withstand radial and axial loads as the lead drive shaft is rotated during an operation of the tool.

2. The drive assembly according to claim 1, wherein the drive assembly housing comprises a plurality of compartments.

3. The drive assembly according to claim 2, wherein the gear assembly is positioned within a first compartment of the plurality of compartments and the bearing system is positioned within a second compartment of the plurality of compartments.

4. The drive assembly according to claim 1, wherein the multi-stage planetary gear assembly comprises a ring gear used by each stage of the multi-stage planetary gear assembly.

5. The drive assembly according to claim 1, wherein the bearing system comprises a radial bearing and a thrust bearing assembly adjacent the radial bearing, and wherein the radial bearing and the thrust bearing assembly are positioned within the drive assembly housing.

6. The drive assembly according to claim 5, wherein the thrust bearing assembly rests on the proximal end portion of the lead drive shaft and around the intermediate portion of the lead drive shaft, and the radial bearing is adjacent the thrust bearing assembly around the intermediate portion of the lead drive shaft.

7. The drive assembly according to claim 1, wherein the bearing system comprises a radial bearing, a first thrust bearing assembly adjacent the radial bearing and a second thrust bearing assembly, wherein the radial bearing and the first thrust bearing assembly are positioned within the drive assembly housing and the second thrust bearing assembly rests on an exterior of the drive assembly housing.

8. The drive assembly according to claim 7, wherein the first thrust bearing assembly rests on the proximal end portion of the lead drive shaft and around the intermediate portion of the lead drive shaft, and the radial bearing is adjacent the first thrust bearing assembly around the intermediate portion of the lead drive shaft, and wherein the second thrust bearing assembly is around a portion of the intermediate portion of the lead drive shaft extending out of the drive assembly housing.

9. The drive assembly according to claim 8, wherein the second thrust bearing assembly is fixed in position relative to the drive assembly housing by a retaining ring coupled to the portion of the intermediate portion of the lead drive shaft extending out of the drive assembly housing.

10. The drive assembly according to claim 1, wherein the proximal end portion being within the drive assembly housing and forming a carrier plate of the output stage of the planetary gear assembly.

11. A drive assembly for a portable, hand-held tool, the drive assembly comprising:
a drive assembly housing;
a gear assembly positioned within the drive assembly housing, the gear assembly including a first stage planetary gear assembly being an input stage and a second stage planetary gear assembly being an output stage, wherein the first stage and the second stage use a common ring gear;
a lead drive shaft having a distal end portion, a proximal end portion and an intermediate portion between the distal end portion and the proximal end portion, the proximal end portion being within the drive assembly housing and forming a carrier plate of the output stage of the planetary gear assembly, the distal end portion being threaded and substantially outside the drive assembly housing, and the intermediate portion being within the drive assembly housing and having a smooth exterior surface; and
a bearing system having a portion within the drive assembly housing and a portion external to the drive assembly housing, the bearing system being interactive with at least the intermediate portion of the lead drive shaft enabling the lead drive shaft to withstand radial and axial loads as the lead drive shaft is rotated during an operation of the tool.

12. The drive assembly according to claim 11, wherein the drive assembly housing comprises a plurality of compartments.

13. The drive assembly according to claim 12, wherein the gear assembly is positioned within a first compartment of the plurality of compartments and the bearing system is positioned within a second compartment of the plurality of compartments.

14. The drive assembly according to claim 11, wherein the bearing system comprises a radial bearing and a thrust bearing assembly adjacent the radial bearing, and wherein the radial bearing and the thrust bearing assembly are positioned within the drive assembly housing.

15. The drive assembly according to claim 14, wherein the thrust bearing assembly rests on the proximal end portion of the lead drive shaft and around the intermediate portion of the lead drive shaft, and the radial bearing is adjacent the thrust bearing assembly around the intermediate portion of the lead drive shaft.

16. The drive assembly according to claim 11, wherein the bearing system comprises a radial bearing, a first thrust bearing assembly adjacent the radial bearing and a second thrust bearing assembly, wherein the radial bearing and the first thrust bearing assembly are positioned within the drive assembly housing and the second thrust bearing assembly rests on an exterior of the drive assembly housing.

17. The drive assembly according to claim 16, wherein the first thrust bearing assembly rests on the proximal end portion of the lead drive shaft around the intermediate portion of the lead drive shaft, and the radial bearing is adjacent the first thrust bearing assembly around the intermediate portion of the lead drive shaft, and wherein the second thrust bearing assembly is around a portion of the intermediate portion of the lead drive shaft extending out of the drive assembly housing.

18. The drive assembly according to claim 17, wherein the second thrust bearing assembly is fixed in position relative to the drive assembly housing by a retaining ring coupled to the portion of the intermediate portion of the lead drive shaft extending out of the drive assembly housing.

* * * * *